United States Patent [19]
Kurahashi et al.

[11] Patent Number: 5,669,226
[45] Date of Patent: Sep. 23, 1997

[54] AIR CONDITIONING APPARATUS FOR A VEHICLE

[75] Inventors: Yasufumi Kurahashi, Ootsu; Minoru Fukumoto, Nara, both of Japan

[73] Assignee: Matsushita Electric Industrial Co., Ltd., Osaka, Japan

[21] Appl. No.: 646,219

[22] Filed: May 6, 1996

[30] Foreign Application Priority Data

May 17, 1995 [JP] Japan .................................. 7-118193

[51] Int. Cl.$^6$ ........................................................ B60H 1/22
[52] U.S. Cl. ........................ 62/227; 62/228.4; 62/229; 62/228.3; 236/78 D
[58] Field of Search .............................. 62/228.1, 228.3, 62/228.4, 228.5, 227, 229, 157, 208, 209; 236/78 D

[56] References Cited

U.S. PATENT DOCUMENTS

| | | | |
|---|---|---|---|
| 4,959,969 | 10/1990 | Okamoto et al. | 236/78 D X |
| 5,295,363 | 3/1994 | Oomura et al. | 62/227 |
| 5,372,015 | 12/1994 | Suzuki et al. | 62/228.4 |
| 5,410,890 | 5/1995 | Arima | 62/228.4 |

*Primary Examiner*—Harry B. Tanner
*Attorney, Agent, or Firm*—Pollock, Vande Sande & Priddy

[57] ABSTRACT

An air conditioning apparatus for an electric vehicle includes an electrically-driven compressor. A desired temperature is set which relates to one of a temperature of air discharged into a vehicle interior and a temperature within the vehicle interior. Detection is given of a temperature related to a heat exchanger. An inverter connected to the compressor is operative for driving the compressor at a variable speed corresponding to a desired rotational speed. A target temperature related to the heat exchanger is calculated in response to the desired temperature. Calculation is given of a difference between the detected temperature and the target temperature. Also, calculation is given of a variation in the detected temperature for every given period. A corrective rotational speed is calculated from the temperature difference and the temperature variation for every given period. Calculation is given of a sum of a current desired rotational speed of the compressor and the corrective rotational speed for every given period. The calculated sum is set as a new desired rotational speed of the compressor for every given period. The inverter is informed of the new desired rotational speed of the compressor.

15 Claims, 21 Drawing Sheets

FIG. 7

$\Delta f (Hz) = f_1 (T_{mSA}, T_{mHE})$

| $T_{mHE}$ (deg) \ $T_{mSA}$ (deg) | −GREAT (~−3.5) | −MID (−3.0~−1.5) | ±SMALL (−1.0~+1.0) | +MID (+1.5~+3.0) | +GREAT (+3.5~) |
|---|---|---|---|---|---|
| −GREAT (~−3.5) | −GREAT (−10) | −GREAT (−10) | −GREAT (−10) | −SMALL (−3) | 0 |
| −MID (−3.0~−1.5) | −GREAT (−10) | −MID (−6) | −SMALL (−3) | 0 | +SMALL (+3) |
| ±SMALL (−1.0~+1.0) | −GREAT (−10) | −SMALL (−3) | 0 | +SMALL (+3) | +GREAT (+10) |
| +MID (+1.5~+3.0) | −SMALL (−3) | 0 | +SMALL (+3) | +MID (+6) | +GREAT (+10) |
| +GREAT (+3.5~) | 0 | +SMALL (+3) | +GREAT (+10) | +GREAT (+10) | +GREAT (+10) |

FIG. 8

$\Delta f (Hz) = f_2 (T_{mSA}, T_{mHE})$

| $T_{mHE}$ \ $T_{mSA}$ | −GREAT (~−3.5) | −MID (−3.0~−1.5) | ±SMALL (−1.0~+1.0) | +MID (+1.5~+3.0) | +GREAT (+3.5~) |
|---|---|---|---|---|---|
| −GREAT (~−3.5) | +GREAT | +GREAT | +GREAT | +SMALL | 0 |
| −MID (−3.0~−1.5) | +GREAT | +MID | +SMALL | 0 | −SMALL |
| ±SMALL (−1.0~+1.0) | +GREAT | +SMALL | 0 | −SMALL | −GREAT |
| +MID (+1.5~+3.0) | +SMALL | 0 | −SMALL | −MID | −GREAT |
| +GREAT (+3.5~) | 0 | −SMALL | −GREAT | −GREAT | −GREAT |

AIR CONDITIONING APPARATUS FOR A VEHICLE

BACKGROUND OF THE INVENTION

1. Field of the Invention

This invention relates to an air conditioning apparatus for a vehicle such as an electric vehicle.

2. Description of the Prior Art

There are various types of air conditioners for vehicles. Each of these air conditioners generally serves to control a temperature within the interior (the passenger's compartment) of the vehicle at a desired temperature. The desired temperature is also referred to as a setting temperature.

In general, air conditioners for electric vehicles include electrically-driven compressors or motor-driven compressors. In a prior-art air conditioner for an electric vehicle, the rotational speed of an electrically-driven compressor remains fixed at a setting speed corresponding to a desired temperature (a setting temperature) within the interior or the passenger's compartment of the vehicle. The setting speed is made independent of a load on the air conditioner. The load on the air conditioner is determined by various factors including the intensity of sunshine applied to the vehicle. Accordingly, the temperature of air discharged from the outlet of the air conditioner tends to vary in accordance with the intensity of sunshine applied to the vehicle. The dependence of the discharged-air temperature upon the sunshine intensity disturbs the control of the vehicle-interior temperature at the desired temperature.

SUMMARY OF THE INVENTION

It is an object of this invention to provide an improved air conditioning apparatus for a vehicle.

A first aspect of this invention provides an air conditioning apparatus for an electric vehicle which comprises an electrically-driven compressor; first means for setting a desired temperature related to one of a temperature of air discharged into a vehicle interior and a temperature within the vehicle interior; a heat exchanger; second means for detecting a temperature related to the heat exchanger; an inverter connected to the compressor for driving the compressor at a variable speed corresponding to a desired rotational speed; third means for calculating a target temperature related to the heat exchanger in response to the desired temperature set by the first means; fourth means for calculating a difference between the temperature detected by the second means and the target temperature calculated by the third means; fifth means for calculating a variation in the temperature detected by the second means for every given period; sixth means for calculating a corrective rotational speed from the temperature difference calculated by the fourth means and the temperature variation calculated by the fifth means for every given period; seventh means for calculating a sum of a current desired rotational speed of the compressor and the corrective rotational speed calculated by the sixth means for every given period, and for setting the calculated sum as a new desired rotational speed of the compressor for every given period; and eighth means for informing the inverter of the new desired rotational speed of the compressor which is set by the seventh means.

A second aspect of this invention is based on the first aspect thereof, and provides an air conditioning apparatus further comprising ninth means for setting a desired flow rate of air discharged into the vehicle interior, and tenth means for limiting an upper side of the new desired rotational speed of the compressor which is set by the seventh means in response to the desired flow rate set by the ninth means.

A third aspect of this invention is based on the first aspect thereof, and provides an air conditioning apparatus further comprising ninth means for selectively introducing air from the vehicle interior or air from a vehicle exterior, and tenth means for limiting an upper side of the new desired rotational speed of the compressor which is set by the seventh means in response to whether the ninth means introduces air from the vehicle interior or air from the vehicle exterior.

A fourth aspect of this invention is based on the third aspect thereof, and provides an air conditioning apparatus further comprising eleventh means for deciding whether cooling operation or heating operation is currently executed, and twelfth means responsive to a result of said deciding by the eleventh means for limiting the upper side of the new desired rotational speed of the compressor which is set by the seventh means in response to whether the cooling operation or the heating operation is currently executed.

A fifth aspect of this invention is based on the first aspect thereof, and provides an air conditioning apparatus further comprising ninth means for detecting a temperature of a motor winding of the compressor, and tenth means for limiting an upper side of the new desired rotational speed of the compressor which is set by the seventh means in response to the temperature detected by the ninth means.

A sixth aspect of this invention is based on the first aspect thereof, and provides an air conditioning apparatus further comprising ninth means for detecting a temperature of a drive portion of the inverter, and tenth means for limiting an upper side of the new desired rotational speed of the compressor which is set by the seventh means in response to the temperature detected by the ninth means.

A seventh aspect of this invention is based on the first aspect thereof, and provides an air conditioning apparatus further comprising ninth means for detecting a pressure at an outlet of the compressor, and tenth means for limiting an upper side of the new desired rotational speed of the compressor which is set by the seventh means in response to the pressure detected by the ninth means.

An eighth aspect of this invention provides an air conditioning apparatus comprising a compressor; a heat exchanger; first means including refrigerant for connecting the compressor and the heat exchanger to allow the refrigerant to flow through the compressor and the heat exchanger; second means for providing a target temperature of air downstream of the heat exchanger; third means for detecting an actual temperature of air downstream of the heat exchanger; fourth means for calculating a difference between the target temperature provided by the second means and the actual temperature detected by the third means; fifth means for detecting a variation in the actual temperature detected by the third means; and sixth means for controlling a rotational speed of the compressor in response to the temperature difference calculated by the fourth means and the temperature variation detected by the fifth means.

A ninth aspect of this invention is based on the eighth aspect thereof, and provides an air conditioning apparatus wherein the sixth means comprises seventh means for calculating a desired rotational speed of the compressor from the temperature difference calculated by the fourth means and the temperature variation detected by the fifth means, and eighth means for controlling an actual rotational speed of the compressor in accordance with the desired rotational speed calculated by the seventh means.

A tenth aspect of this invention is based on the ninth aspect thereof, and provides an air conditioning apparatus further comprising ninth means for setting a desired flow rate of discharged air, and tenth means for limiting an upper side of the desired rotational speed calculated by the seventh means in response to the desired flow rate set by the ninth means.

An eleventh aspect of this invention is based on the ninth aspect thereof, and provides an air conditioning apparatus further comprising ninth means for selectively introducing air from an air-conditioned space or air from an exterior of the air-conditioned space, and tenth means for limiting an upper side of the desired rotational speed calculated by the seventh means in response to whether the ninth means introduces air from the air-conditioned space or air from the exterior of the air-conditioned space.

A twelfth aspect of this invention is based on the eleventh aspect thereof, and provides an air conditioning apparatus further comprising eleventh means for deciding whether cooling operation or heating operation is currently executed, and twelfth means responsive to a result of said deciding by the eleventh means for limiting the upper side of the desired rotational speed calculated by the seventh means in response to whether the cooling operation or the heating operation is currently executed.

A thirteenth aspect of this invention is based on the ninth aspect thereof, and provides an air conditioning apparatus further comprising ninth means for detecting a temperature of a motor winding of the compressor, and tenth means for limiting an upper side of the desired rotational speed calculated by the seventh means in response to the temperature detected by the ninth means.

A fourteenth aspect of this invention is based on the ninth aspect thereof, and provides an air conditioning apparatus further comprising an inverter provided in the eighth means for driving the compressor at a rotational speed corresponding to the desired rotational speed thereof, ninth means for detecting a temperature of a drive portion of the inverter, and tenth means for limiting an upper side of the desired rotational speed in response to the temperature detected by the ninth means.

A fifteenth aspect of this invention is based on the ninth aspect thereof, and provides an air conditioning apparatus further comprising ninth means for detecting a pressure at an outlet of the compressor, and tenth means for limiting an upper side of the desired rotational speed calculated by the seventh means in response to the pressure detected by the ninth means.

BRIEF DESCRIPTION OF THE DRAWINGS

FIG. 7 is a diagram of a first example of a relation among a corrective rotational speed f1 of a motor of an electrically-driven compressor, a temperature difference TmSA, and a temperature variation TmHE in the apparatus of FIG. 3.

FIG. 8 is a diagram of a second example of the relation among the corrective rotational speed f1 of the motor of the electrically-driven compressor, the temperature difference TmSA, and the temperature variation TmHE in the apparatus of FIG. 3.

DESCRIPTION OF THE PREFERRED EMBODIMENTS

A prior-art air conditioner for an electric vehicle will be described hereinafter for a better understanding of this invention.

Figure 1:
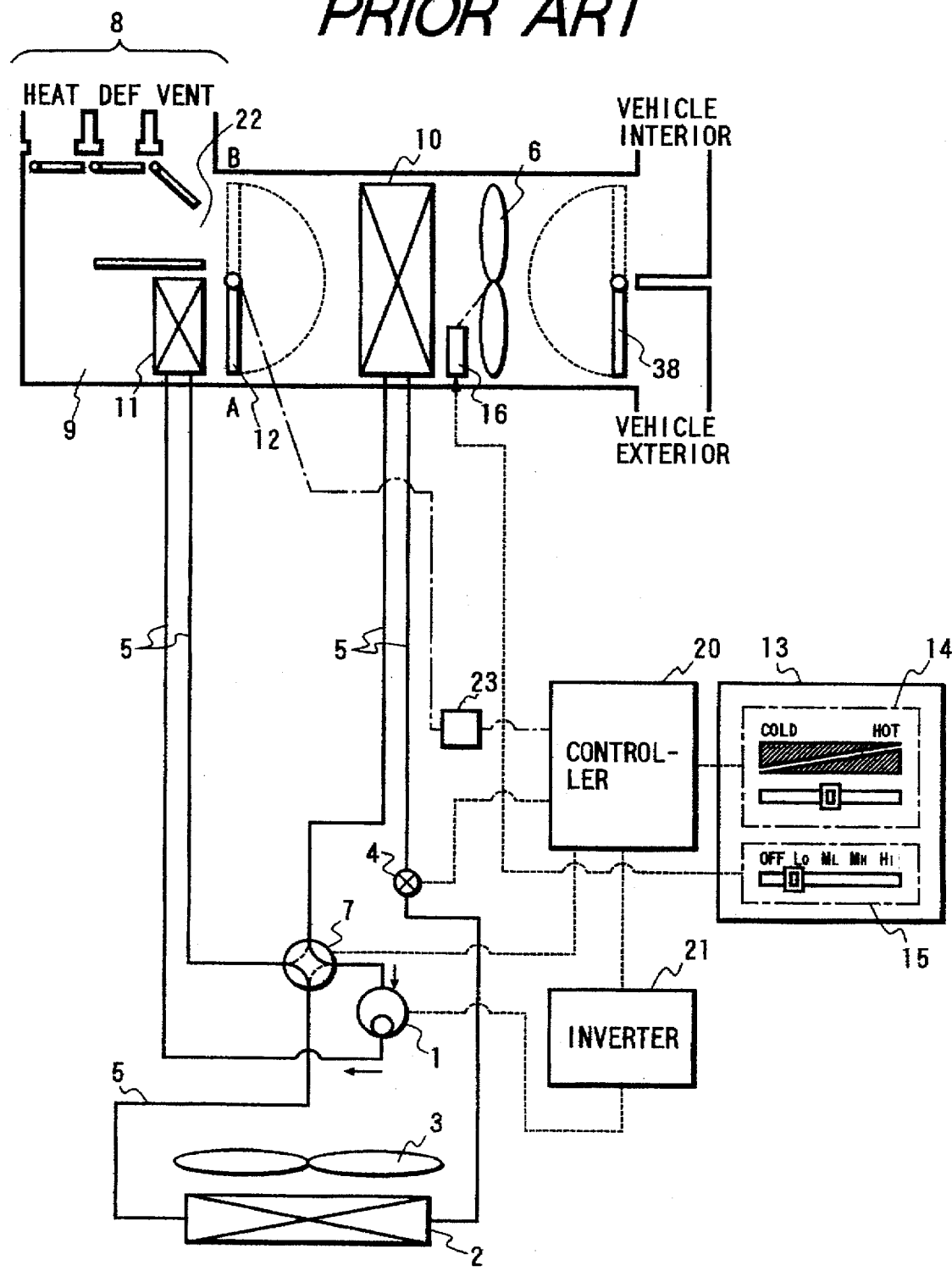
FIG. 1 is a diagram of a prior-art air conditioner for an electric vehicle.

FIG. 1 shows a prior-art air conditioner for an electric vehicle which is a heat pump apparatus able to execute cooling, heating, and dehumidifying processes. With reference to FIG. 1, the prior-art air conditioner includes an electrically-driven or motor-driven compressor 1, a heat exchanger 2, and a blower or fan 3. The heat exchanger 2 is located outside the interior (the passenger's compartment) of the vehicle. The heat exchanger 2 can be exposed to an air flow (an atmosphere flow) generated by the blower 3.

The prior-art air conditioner of FIG. 1 includes an air intake device or an incoming-air selection device 38 disposed in an upstream end of an air duct. The upstream end of the air duct has a first inlet for introducing air from the interior of the vehicle, and a second inlet for introducing air from the exterior of the vehicle. The air intake device 38 has a rotatable valve for selecting one out of air (indoor air) coming from the vehicle interior, air (outdoor air or fresh air) coming from the vehicle exterior, and a mixture of indoor air and outdoor air as incoming air drawn toward a main portion of the air duct. A blower or fan 6 disposed in a region of downstream of downstream of the air intake device 38 drives the incoming air from the air intake device 38 toward a downstream side.

In the prior-art air conditioner of FIG. 1, a downstream portion of the air duct is divided by partition walls into a first branch passage 9 and a second branch passage 22. A heat exchanger 10 is disposed in a region of the air duct downstream of the blower 6 and upstream of the first and second branch passages 9 and 22. A heat exchanger 11 is disposed in the first branch passage 9. The first and second branch passages 9 and 22 meet at a downstream end of the air duct. The downstream end of the air duct has an outlet 8 for discharging air into the vehicle interior. A rotatable mix damper 12 is disposed in a region of the air duct downstream of the heat exchanger 10 and immediately upstream of inlets of the first and second branch passages 9 and 22. The mix damper 12 controls the ratio between the rate of an air flow into the first branch passage 9 and the rate of an air flow into the second branch passage 22, thereby adjusting the temperature of air discharged via the outlet 8 into the vehicle interior. The mix damper 12 is driven by a mix actuator 23 of an electrically-powered type.

In the prior-art air conditioner of FIG. 1, a four-way valve 7 of an electrically-driven type, a refrigerant throttle valve 4 of an electrically-driven type, the heat exchangers 2, 10, and 11, and the electrically-driven compressor I are connected by pipes 5 in a loop where refrigerant can be circulated. An inverter 21 serves to drive the motor of the electrically-driven compressor 1 at a variable rotational speed. The circulation flow rate of refrigerant in the loop depends on the rotational speed of the motor of the electrically-driven compressor 1 and also the position of the refrigerant throttle valve 4.

The prior-art air conditioner of FIG. 1 includes an operation panel 13 on which a temperature setting device 14 and an air-flowrate setting device 15 are provided. The temperature setting device 14 includes a variable resistor for setting a desired temperature (a setting temperature) within the vehicle interior or setting a parameter related to the temperature of air discharged via the outlet 8 into the vehicle interior. The air-flow-rate setting device 15 includes switches for setting a desired flow rate of air discharged via the outlet 8 into the vehicle interior. The air-flow-rate setting device 15 is electrically connected to a resistor 16 for adjusting the rotational speed of the blower 6, that is, the flow rate of air discharged via the outlet 8 into the vehicle interior. The resistor 16 is controlled in response to the output signal of the air-flow-rate setting device 15 so that the actual flow rate of air discharged into the vehicle interior will be substantially equal to the desired air flow rate set by the air-flow-rate setting device 15.

The prior-art air conditioner of FIG. 1 includes a controller 20 having a microcomputer or a similar device. The controller 20 is electrically connected to the refrigerant throttle valve 4, the four-way valve 7, the mix actuator 23, the temperature setting device 14, and the inverter 21. The controller 20 operates in accordance with a program stored in an internal ROM. According to the program, the controller 20 controls the refrigerant throttle valve 4, the four-way valve 7, the mix actuator 23, and the inverter 21 in response to the desired temperature set by the temperature setting device 14.

Figure 2:
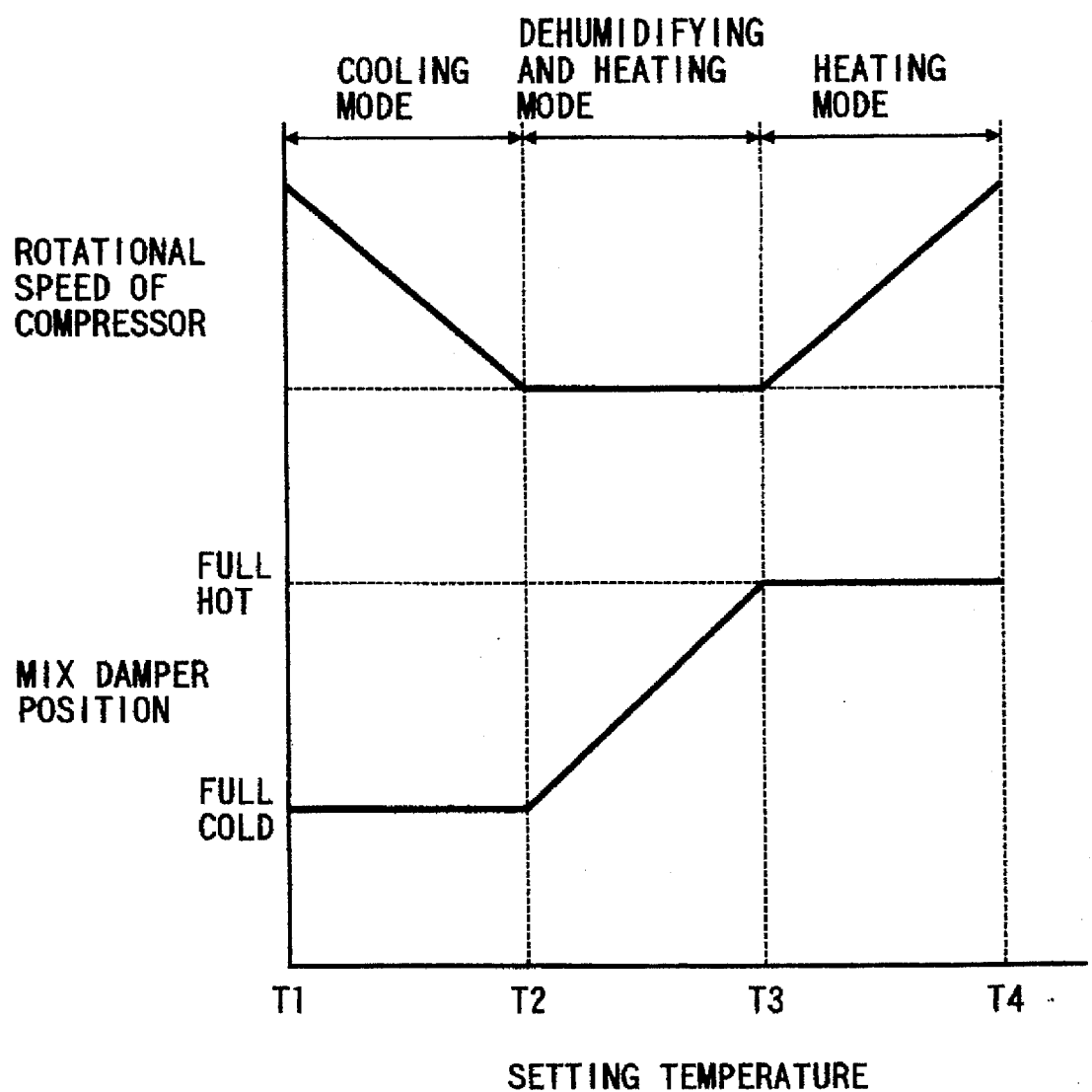
FIG. 2 is a diagram of a relation among a setting temperature, the position of a mix damper, and the rotational speed of an electrically-driven compressor in the prior-art air conditioner of FIG. 1.

The controller 20 decides a desired mode of operation of the air conditioner in response to the desired temperature set by the temperature setting device 14. When the desired temperature is in a first predetermined range, the controller 20 decides that a cooling mode of operation of the air conditioner is desired. As shown in FIG. 2, the first temperature range extends between temperature points T1 and T2. When the desired temperature is in a second predetermined range, the controller 20 decides that a dehumidifying and heating mode of operation of the air conditioner is desired. As shown in FIG. 2, the second temperature range extends between the temperature point T2 and a temperature point T3. When the desired temperature is in a third predetermined range, the controller 20 decides that a heating mode of operation of the air conditioner is desired. As shown in FIG. 2, the third temperature range extends between the temperature point T3 and a temperature point T4. In addition, the controller 20 calculates a desired rotational speed of the motor of the electrically-driven compressor 1 from the desired temperature set by the temperature setting device 14. The controller 20 adjusts the inverter 21 in response to the calculated desired rotational speed so that the actual rotational speed of the motor of the electrically-driven compressor 1 will be substantially equal to the desired rotational speed thereof. Further, the controller 20 calculates a desired position of the mix damper 12 from the desired temperature set by the temperature setting device 14. The controller 20 adjusts the mix actuator 23 in response to the calculated desired position so that the actual position of the mix damper 12 will be substantially equal to the desired position thereof. Moreover, the controller 20 changes the four-way valve 7 and controls the refrigerant throttle valve 4 in response to the result of the decision regarding the desired mode of operation of the air conditioner.

The prior-art air conditioner of FIG. 1 operates as follows. In the case where the cooling mode of operation of the air conditioner is required, the desired temperature within the vehicle interior is set in the temperature range between the temperature points T1 and T2 (see FIG. 2) by manipulating the temperature setting device 14. The temperature points T1 and T2 correspond to, for example, 5° C. and 15° C. respectively. In this case, the controller 20 judges the desired mode of operation of the air conditioner to be the cooling mode. Accordingly, the controller 20 changes the four-way valve 7 to a position at which the air conditioner can execute a cooling process. In addition, the controller 20 adjusts the refrigerant throttle valve 4 to a suitable position. Further, the controller 20 sets the desired position of the mix damper 12 to a full cold position "A" (see FIG. 1). The controller 20 adjusts the mix actuator 23 in response to the desired position so that the mix damper 12 will be in the full cold position "A" where the first branch passage 9 is fully blocked while the second branch passage 22 is fully unblocked. Moreover, the controller 20 calculates the desired rotational speed of the motor of the electrically-driven compressor 1 from the desired temperature within the vehicle interior. It is shown in FIG. 2 that the desired rotational speed decreases as the desired temperature (the setting temperature) within the vehicle interior increases from the temperature point T1 to the temperature point T2. The controller 20 adjusts the inverter 21 in response to the calculated desired rotational speed so that the actual rotational speed of the motor of the electrically-driven compressor 1 will be substantially equal to the desired rotational speed thereof. Accordingly, during the cooling mode of operation of the air conditioner, the rotational speed of the motor of the electrically-driven compressor 1, that is, the circulation flow rate of refrigerant, is varied in accordance with the desired temperature of the vehicle interior. Thus, the temperature of air discharged via the outlet 8 into the vehicle interior can be changed in response to the desired temperature within the vehicle interior.

In the case where the dehumidifying and heating mode of operation of the air conditioner is required, the desired temperature within the vehicle interior is set in the temperature range between the temperature points T2 and T3 (see FIG. 2) by manipulating the temperature setting device 14. The temperature points T2 and T3 correspond to, for example, 15° C. and 30° C. respectively. In this case, the controller 20 judges the desired mode of operation of the air conditioner to be the dehumidifying and heating mode. Accordingly, the controller 20 changes the four-way valve 7 to a position at which the air conditioner can execute a cooling process. In addition, the controller 20 adjusts the refrigerant throttle valve 4 to a suitable position. Further, the controller 20 calculates the desired position of the mix damper 12 from the desired temperature within the vehicle interior. It is shown in FIG. 2 that the desired position of the mix damper 12 moves from the full cold position ("A" in FIG. 1) to a full hot position ("B" in FIG. 1) as the desired temperature within the vehicle interior increases from the temperature point T2 to the temperature point T3. The controller 20 adjusts the mix actuator 23 in response to the desired position so that the actual position of the mix damper 12 will be substantially equal to the desired position thereof. Moreover, the controller 20 sets the desired rotational speed of the motor of the electrically-driven compressor 1 to a predetermined minimum rotational speed. The controller 20 adjusts the inverter 21 in response to the desired rotational speed (the minimum rotational speed) so that the actual rotational speed of the motor of the electrically-driven compressor 1 will be substantially equal to the minimum rotational speed thereof. Accordingly, during the dehumidifying and heating mode of operation of the air conditioner, the position of the mix damper 12 is varied in accordance with the desired temperature of the vehicle Interior. Thus, the temperature of air discharged via the outlet 8 into the vehicle interior can be changed in response to the desired temperature within the vehicle interior.

In the case where the heating mode of operation of the air conditioner is required, the desired temperature within the vehicle interior is set in the temperature range between the temperature points T3 and T4 (see FIG. 2) by manipulating the temperature setting device 14. The temperature point T3 corresponds to, for example, 30° C. In this case, the controller 20 judges the desired mode of operation of the air conditioner to be the heating mode. Accordingly, the controller 20 changes the four-way valve 7 to a position at which the air conditioner can execute a heating process. In addition, the controller 20 adjusts the refrigerant throttle valve 4 to a suitable position. Further, the controller 20 sets the desired position of the mix damper 12 to the full hot position "B" (see FIG. 1). The controller 20 adjusts the mix actuator 23 in response to the desired position so that the mix damper 12 will be in the full hot position "B" where the first branch passage 9 is fully unblocked while the second branch passage 22 is fully blocked. Moreover, the controller 20 calculates the desired rotational speed of the motor of the electrically-driven compressor 1 from the desired temperature within the vehicle interior. It is shown in FIG. 2 that the desired rotational speed increases as the desired temperature within the vehicle interior increases from the temperature point T3 to the temperature point T4. The controller 20 adjusts the inverter 21 in response to the calculated desired rotational speed so that the actual rotational speed of the motor of the electrically-driven compressor 1 will be substantially equal to the desired rotational speed thereof. Accordingly, during the heating mode of operation of the air conditioner, the rotational speed of the motor of the electrically-driven compressor 1, that is, the circulation flow rate of refrigerant, is varied in accordance with the desired temperature of the vehicle interior. Thus, the temperature of air discharged via the outlet 8 into the vehicle interior can be changed in response to the desired temperature within the vehicle interior.

In the prior-art air conditioner of FIG. 1, the actual rotational speed of the motor of the electrically-driven compressor 1 generally remains fixed at the desired rotational speed which is uniquely determined by the desired temperature within the vehicle interior as shown in FIG. 2. The desired rotational speed is made independent of a load on the air conditioner. The load on the air conditioner is determined by various factors including the intensity of sunshine applied to the vehicle and the flow rate of air discharged via the outlet 8 into the vehicle interior. Accordingly, the temperature of air discharged via the outlet 8 into the vehicle interior tends to vary when the intensity of sunshine applied to the vehicle changes, for example, when the vehicle moves into a tunnel from a place exposed to sunshine. The dependence of the discharged-air temperature upon the sunshine intensity disturbs the control of the vehicle-interior temperature at the desired temperature.

In the prior-art air conditioner of FIG. 1, the desired rotational speed of the motor of the electrically-driven compressor 1 remains fixed independent of the flow rate of air discharged via the outlet 8 into the vehicle interior. The desired rotational speed of the motor of the electrically-driven compressor 1 determines the rate of work executed by the air conditioner. The flow rate of air discharged via the outlet 8 into the vehicle interior is one of factors determining the load on the air conditioner. Generally, it seems better for the control of the vehicle-interior temperature that the rate of work executed by the air conditioner is increased as the load on the air conditioner increases. Accordingly, it appears better that the desired rotational speed of the motor of the electrically-driven compressor 1 is increased as the flow rate of air discharged via the outlet 8 into the vehicle interior increases.

First Embodiment

Figure 3:
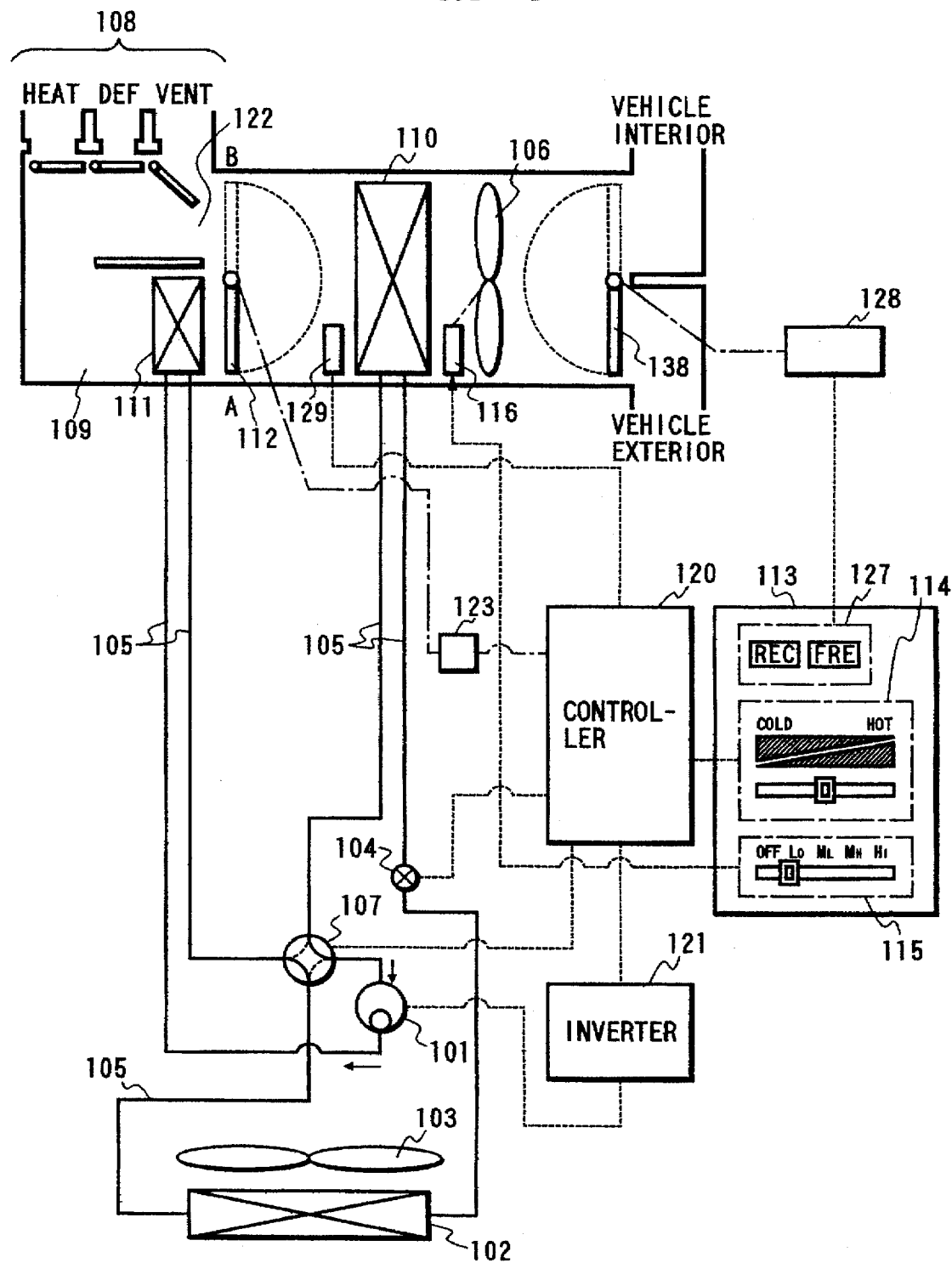
FIG. 3 is a diagram of an air conditioning apparatus for an electric vehicle according to a first embodiment of this invention.

FIG. 3 shows an air conditioning apparatus for an electric vehicle according to a first embodiment of this invention which is a heat pump apparatus able to execute cooling, heating, and dehumidifying processes. With reference to FIG. 3, the air conditioning apparatus includes an electrically-driven or motor-driven compressor 101 a heat exchanger 102, and a blower or fan 103. The heat exchanger 102 is located outside the interior (the passenger's compartment) of the vehicle. The heat exchanger 102 also extends outside an air duct. The heat exchanger 102 can be exposed to an air flow (an atmosphere flow) generated by the blower 103.

The air conditioning apparatus of FIG. 3 includes an air intake device or an incoming-air selection device 138 disposed in an upstream end of the air duct. The upstream end of the air duct has a first inlet for introducing air from the interior of the vehicle, and a second inlet for introducing air from an exterior of the vehicle. The air intake device 138 has a rotatable valve for selecting one out of air (indoor air) coming from the vehicle interior, air (outdoor air or fresh air) coming from the vehicle exterior, and a mixture of indoor air and outdoor air as incoming air drawn toward a main portion of the air duct. The valve in the air intake device 138 is driven by an electrically-powered intake actuator 128. A blower or fan 106 disposed in a region of the air duct downstream of the air intake device 138 drives the incoming air from the air intake device 138 toward a downstream side.

In the air conditioning apparatus of FIG. 3, a downstream portion of the air duct is divided by partition walls into a first branch passage 109 and a second branch passage 122. A heat exchanger 110 is disposed in a region of the air duct downstream of the blower 106 and upstream of the first and second branch passages 109 and 122. A heat exchanger 111 is disposed in the first branch passage 109. The first and second branch passages 109 and 122 meet at a downstream end of the air duct. The downstream end of the air duct has an outlet 108 for discharging air into the vehicle interior. A rotatable mix damper 112 is disposed in a region of the air duct downstream of the heat exchanger 110 and immediately upstream of inlets of the first and second branch passages 109 and 122. The mix damper 112 controls the ratio between the rate of an air flow into the first branch passage 109 and the rate of an air flow into the second branch passage 122, thereby adjusting the temperature of air discharged via the outlet 108 into the vehicle interior. The mix damper 112 is driven by a mix actuator 123 of an electrically-powered type.

In the air conditioning apparatus of FIG. 3, a four-way valve 107 of an electrically-driven type, a refrigerant throttle valve 104 of an electrically-driven type, the heat exchangers 102, 110, and 111, and the electrically-driven compressor 101 are connected by pipes 105 in a loop where refrigerant can be circulated. An inverter 121 serves to drive the motor of the electrically-driven compressor 101 at a variable rotational speed. The circulation flow rate of refrigerant in the loop depends on the rotational speed of the motor of the electrically-driven compressor 101 and also the position of the refrigerant throttle valve 104.

The air conditioning apparatus of FIG. 3 includes an operation panel 113 on which an intake air selector 127, a temperature setting device 114, and an air-flow-rate setting device 115 are provided. The incoming air selector 127 includes switches corresponding to air recirculation (indoor air introduction) and fresh air introduction respectively. The intake air selector 127 is electrically connected to the intake actuator 128. The intake actuator 128 drives the air intake device 138 in response to an output signal of the intake air selector 127. The temperature setting device 114 includes a variable resistor for setting a desired temperature (a setting temperature) within the vehicle interior or setting a parameter related to the temperature of air discharged via the outlet 108 into the vehicle interior. The air-flow-rate setting device 115 includes switches for setting a desired flow rate of air discharged via the outlet 108 into the vehicle interior. The air-flow-rate setting device 115 is electrically connected to a resistor 116 for adjusting the rotational speed of the blower 106, that is, the flow rate of air discharged via the outlet 108 into the vehicle interior. The resistor 116 is controlled in response to the output signal of the air-flow-rate setting device 115 so that the actual flow rate of air discharged into the vehicle interior will be substantially equal to the desired air flow rate set by the air-flow-rate setting device 115. A temperature sensor 129 disposed in a region of the air duct downstream of the heat exchanger 110 and upstream of the mix damper 112. The temperature sensor 129 detects the temperature of air at a place downstream of the heat exchanger 110 and upstream of the mix damper 112.

The air conditioning apparatus of FIG. 3 includes a controller 120 having a microcomputer or a similar device. The controller 120 includes a combination of a CPU, a ROM, a RAM, and an input/output port (an interface). The controller 120 is electrically connected to the refrigerant throttle valve 104, the four-way valve 107, the mix actuator 123, the temperature setting device 114, the inverter 121, and the temperature sensor 129. The controller 120 operates in accordance with a program stored in the internal ROM. According to the program, the controller 120 controls the refrigerant throttle valve 104, the four-way valve 107, the mix actuator 123, and the inverter 121 in response to the desired temperature set by the temperature setting device 114 and the temperature detected by the temperature sensor 129.

Figure 4:
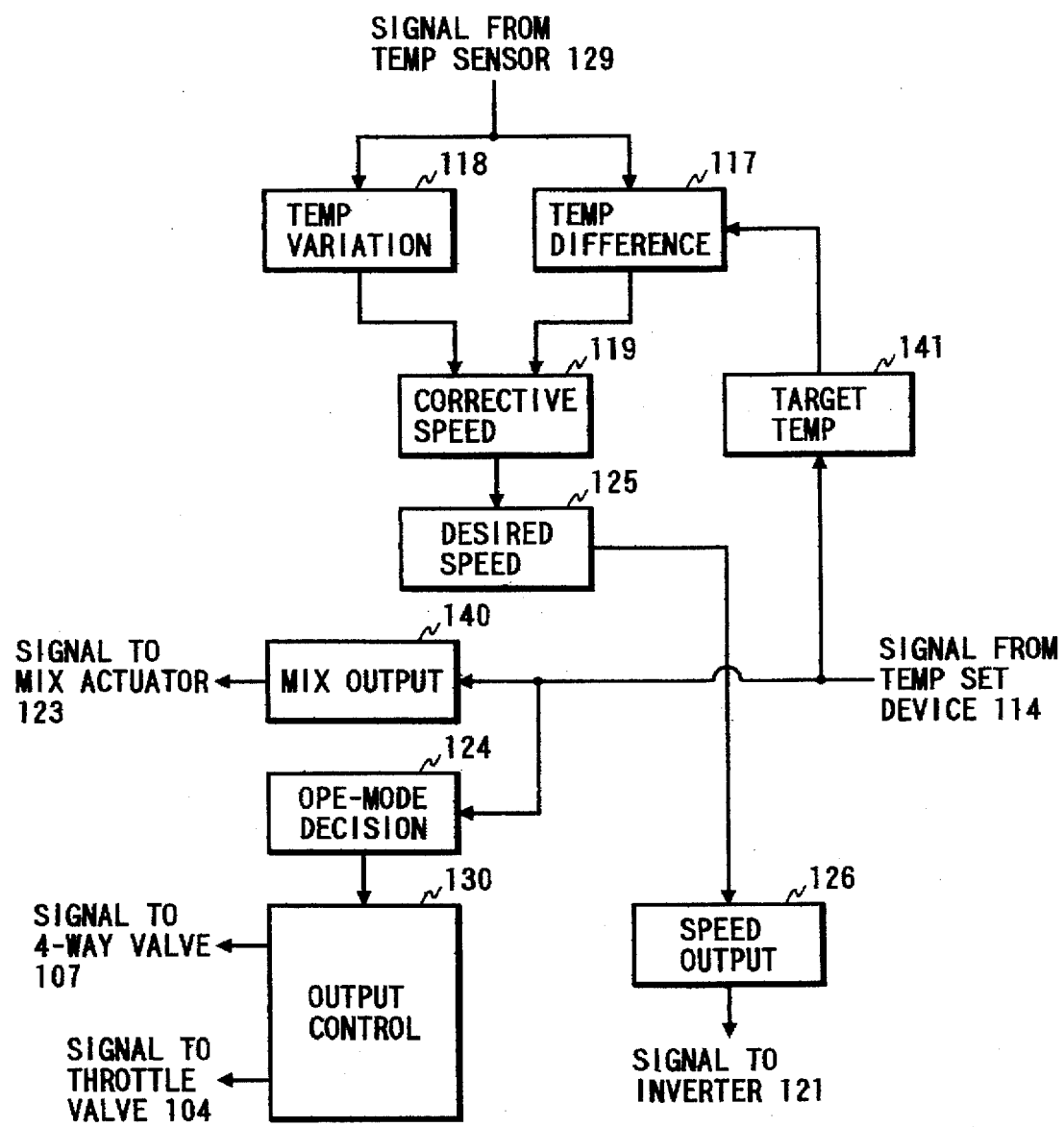
FIG. 4 is a flow diagram of operation of a controller in FIG. 3.
Figure 5:
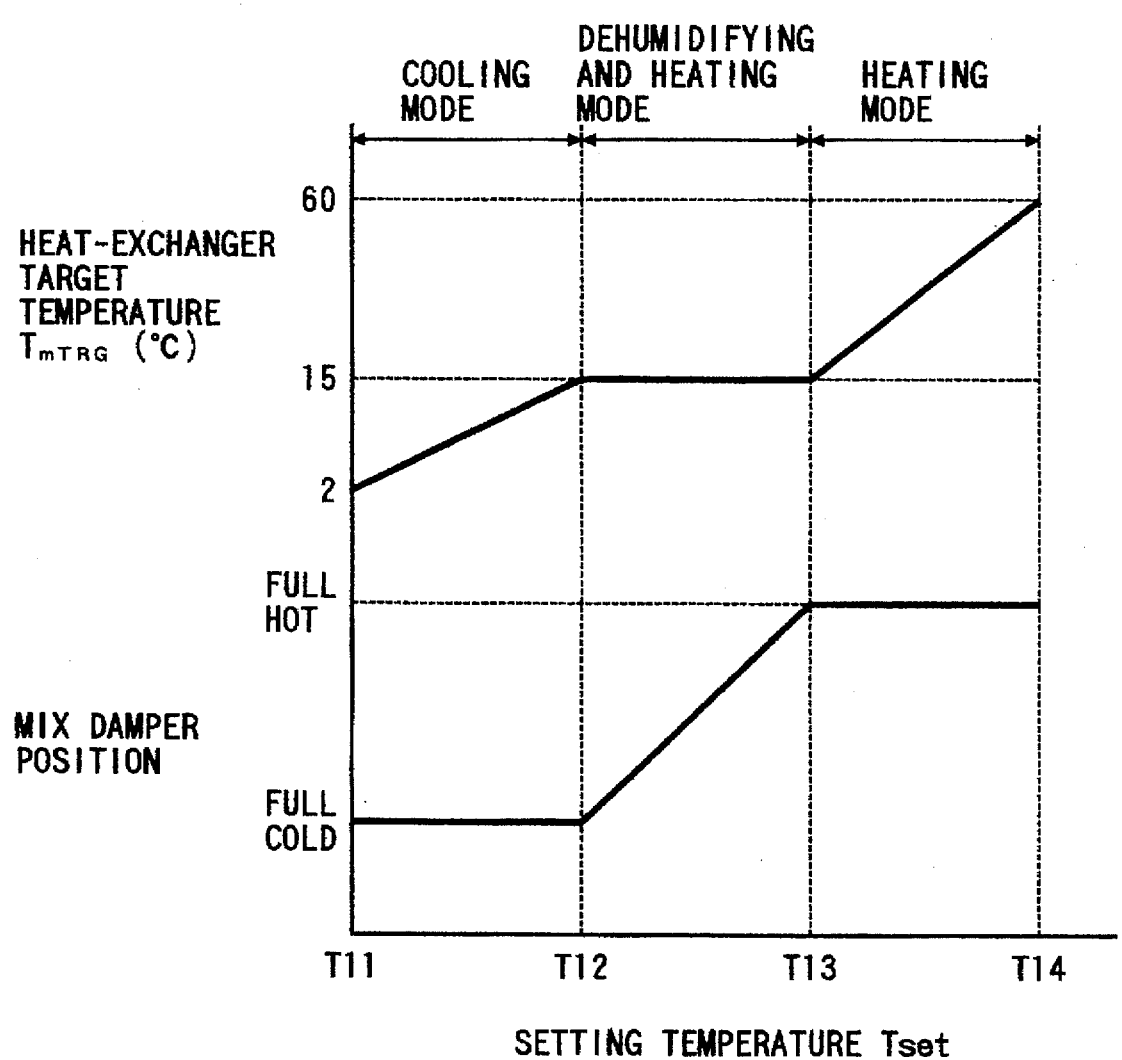
FIG. 5 is a diagram of a relation among a setting temperature, the position of a mix damper, and a target temperature of air downstream of a heat exchanger in the apparatus of FIG. 3.

FIG. 4 is a flow diagram of operation of the controller 120. With reference to FIG. 4, an operation-mode deciding block 124 is informed of the desired temperature set by the temperature setting device 114. The operation-mode deciding block 124 decides a desired mode of operation of the air conditioning apparatus in response to the desired temperature set by the temperature setting device 114. When the desired temperature is in a first predetermined range, the operation-mode deciding block 124 decides that a cooling mode of operation of the air conditioning apparatus is desired. As shown in FIG. 5, the first predetermined range extends between preset temperature points T11 and T12. When the desired temperature is in a second predetermined range, the operation-mode deciding block 124 decides that a dehumidifying and heating mode of operation of the air conditioning apparatus is desired. As shown in FIG. 5, the second predetermined temperature range extends between the preset temperature point T12 and a preset temperature point T13. When the desired temperature is in a third predetermined range, the operation-mode deciding block 124 decides that a heating mode of operation of the air conditioning apparatus is desired. As shown in FIG. 5, the third predetermined temperature range extends between the preset temperature point T13 and a preset temperature point T14. A target-temperature calculating block 141 is informed of the desired temperature set by the temperature setting device 114. The target-temperature calculating block 141 calculates a target temperature of air downstream of the heat exchanger 110 from the desired temperature set by the temperature setting device 114. A difference calculating block 117 is informed of the target temperature calculated by the target-temperature calculating block 141. Also, the difference calculating block 117 is informed of the actual temperature of air downstream of the heat exchanger 110 which is detected by the temperature sensor 129. The difference calculating block 117 calculates the difference between the target temperature and the actual temperature. A temperature-variation calculating block 118 is informed of the actual temperature of air downstream of the heat exchanger 110 which is detected by the temperature sensor 129. The temperature-variation calculating block 118 calculates a variation in the actual temperature which occurs during every given period. A corrective-speed calculating block 119 is informed of the temperature difference calculated by the difference calculating block 117. Also, the corrective-speed calculating block 119 is informed of the temperature variation calculated by the temperature-variation calculating block 118. The corrective-speed calculating block 119 calculates a corrective rotational speed of the motor of the electrically-driven compressor 101 from the temperature difference and the temperature variation. A desired-speed calculating block 125 is informed of the corrective rotational speed calculated by the corrective-speed calculating block 119. The desired-speed calculating block 125 repetitively updates a desired rotational speed of the motor of the electrically-driven compressor 101 in response to the corrective rotational speed. Specifically, a new desired rotational speed is equal to the sum of an immediately-preceding desired rotational speed and the corrective rotational speed. A speed outputting block 126 is informed of the desired rotational speed of the motor of the electrically-driven compressor 101 which is given by the desired-speed calculating block 125. The speed outputting block 126 outputs information of the desired rotational speed to the inverter 121. Accordingly, the inverter 121 is adjusted in response to the desired rotational speed so that the actual rotational speed of the motor of the electrically-driven compressor 101 will be substantially equal to the desired rotational speed thereof. A mix outputting block 140 is informed of the desired temperature set by the temperature setting device 114. The mix outputting block 140 calculates a desired position of the mix damper 112 from the desired temperature set by the temperature setting device 114. The mix outputting block 140 adjusts the mix actuator 123 in response to the calculated desired position so that the actual position of the mix damper 112 will be substantially equal to the desired position thereof. An output controlling block 130 is informed of the result of the decision executed by the operation-mode deciding block 124. The output controlling block 130 changes the four-way valve 107 and controls the refrigerant throttle valve 104 in response to the result of the decision executed by the operation-mode deciding block 124, that is, the result of the decision regarding the desired mode of operation of the air conditioning apparatus.

The air conditioning apparatus of FIG. 3 operates as follows. In the case where the cooling mode of operation of the air conditioning apparatus is required, the desired temperature (the setting temperature) within the vehicle interior is set in the temperature range between the temperature points T11 and T12 (see FIG. 5) by manipulating the temperature setting device 114. The temperature points T11 and T12 correspond to, for example, 5° C. and 15° C. respectively. In this case, the controller 120 judges the desired mode of operation of the air conditioning apparatus to be the cooling mode. Accordingly, the controller 120 changes the four-way valve 107 to a position at which the air conditioning apparatus can execute a cooling process with respect to air in the air duct. This position of the four-way valve 107 is denoted by the solid lines in FIG. 3. In addition, the controller 120 adjusts the refrigerant throttle valve 104 to a suitable position. Further, the controller 120 sets the desired position of the mix damper 112 to a full cold position "A" (see FIG. 3). The controller 120 adjusts the mix actuator 123 in response to the desired position so that the mix damper 112 will be in the full cold position "A" where the first branch passage 109 is fully blocked while the second branch passage 122 is fully unblocked. Moreover, the controller 120 calculates a target temperature TmTRG of air downstream of the heat exchanger 110 from the desired temperature (the setting temperature) Tset given by the temperature setting device 114. It is shown in FIG. 5 that the target temperature TmTRG of air downstream of the heat exchanger 110 increases as the desired temperature Tset within the vehicle interior rises from the temperature point T11 to the temperature point T12. In this case, the target temperature TmTRG is variable in the range of, for example, 2° C. to 15° C. The temperature sensor 129 informs the controller 120 of the actual temperature Tm of air downstream of the heat exchanger 110. The controller 120 calculates the difference TmSA between the target temperature TmTRG and the actual temperature Tm. The controller 120 calculates a variation TmHE in the actual temperature Tm which occurs during every given period. The given period is equal to, for example, 10 seconds. The controller 120 calculates a corrective rotational speed Δf of the motor of the electrically-driven compressor 101 from the temperature difference TmSA and the temperature variation TmHE. The controller 120 repetitively updates a desired rotational speed "f" of the motor of the electrically-driven compressor 101 in response to the corrective rotational speed Δf. Specifically, a new desired rotational speed "f" is equal to the sum of an immediately-preceding desired rotational speed "f" and the corrective rotational speed Δf. The controller 120 adjusts the inverter 121 in response to the desired rotational speed "f" so that the actual rotational speed of the motor of the electrically-driven compressor 101 will be substantially equal to the desired rotational speed "f" thereof.

In the case where the dehumidifying and heating mode of operation of the air conditioning apparatus is required, the desired temperature within the vehicle interior is set in the temperature range between the temperature points T12 and T13 (see FIG. 5) by manipulating the temperature setting device 114. The temperature points T12 and T13 correspond to, for example, 15° C. and 30° C. respectively. In this case, the controller 120 judges the desired mode of operation of the air conditioning apparatus to be the dehumidifying and heating mode. Accordingly, the controller 120 changes the four-way valve 107 to the position at which the air conditioning apparatus can execute the cooling process with respect to air in the air duct. This position of the four-way valve 107 is denoted by the solid lines in FIG. 3. In addition, the 15 controller 120 adjusts the refrigerant throttle valve 104 to a suitable position. Further, the controller 120 calculates a desired position of the mix damper 112 from the desired temperature (the setting temperature) Tset given by the temperature setting device 114. It is shown in FIG. 5 that the desired position of the mix damper 112 moves from the full cold position ("A" in FIG. 3) to a full hot position ("B" in FIG. 3) as the desired temperature Tset within the vehicle interior rises from the temperature point T12 to the temperature point T13. The controller 120 adjusts the mix actuator 123 in response to the calculated desired position so that the actual position of the mix damper 112 will be substantially equal to the desired position thereof. When the mix damper 112 assumes the full hot position ("B" in FIG. 3), the first branch passage 109 is fully unblocked and the second branch passage 122 is fully blocked. Moreover, the controller 120 sets the target temperature TmTRG of air downstream of the heat exchanger 110 to a preset temperature equal to, for example, 15° C. The temperature sensor 129 informs the controller 120 of the actual temperature Tm of air downstream of the heat exchanger 110. The controller 120 calculates the difference TmSA between the target temperature TmTRG and the actual temperature Tm. The controller 120 calculates a variation TmHE in the actual temperature Tm which occurs during every given period. The given period is equal to, for example, 10 seconds. The controller 120 calculates a corrective rotational speed Δf of the motor of the electrically-driven compressor 101 from the temperature difference TmSA and the temperature variation TmHE. The controller 120 repetitively updates a desired rotational speed "f" of the motor of the electrically-driven compressor 101 in response to the corrective rotational speed Δf. Specifically, a new desired rotational speed "f" is equal to the sum of an immediately-preceding desired rotational speed "f" and the corrective rotational speed Δf. The controller 120 adjusts the inverter 121 in response to the desired rotational speed "f" so that the actual rotational speed of the motor of the electrically-driven compressor 101 will be substantially equal to the desired rotational speed "f" thereof.

In the case where the heating mode of operation of the air conditioning apparatus is required, the desired temperature within the vehicle interior is set in the temperature range between the temperature points T13 and T14 (see FIG. 5) by manipulating the temperature setting device 114. The temperature points T13 and T14 correspond to, for example, 30° C. and 60° C. respectively. In this case, the controller 120 judges the desired mode of operation of the air conditioning apparatus to be the heating mode. Accordingly, the controller 120 changes the four-way valve 107 to a position at which the air conditioning apparatus can execute a heating process with respect to air in the air duct. This position of the four-way valve 107 is denoted by the broken lines in FIG. 3. In addition, the controller 120 adjusts the refrigerant throttle valve 104 to a suitable position. Further, the controller 120 sets the desired position of the mix damper 112 to the full hot position "B" (see FIG. 3). The controller 120 adjusts the mix actuator 123 in response to the desired position so that the mix damper 112 will be in the full hot position "B" where the first branch passage 109 is fully unblocked while the second branch passage 122 is fully blocked. Moreover, the controller 120 calculates a target temperature TmTRG of air downstream of the heat exchanger 110 from the desired temperature (the setting temperature) Tset given by the temperature setting device 114. It is shown in FIG. 5 that the target temperature TmTRG of air downstream of the heat exchanger 110 increases as the desired temperature Tset within the vehicle interior rises from the temperature point T13 to the temperature point T14. In this case, the target temperature TmTRG is variable in the range of, for example, 15° C. to 60° C. The temperature sensor 129 informs the controller 120 of the actual temperature Tm of air downstream of the heat exchanger 110. The controller 120 calculates the difference TmSA between the target temperature TmTRG and the actual temperature Tm. The controller 120 calculates a variation TmHE in the actual temperature Tm which occurs during every given period. The given period is equal to, for example, 10 seconds. The controller 120 calculates a corrective rotational speed Δf of the motor of the electrically-driven compressor 101 from the temperature difference TmSA and the temperature variation TmHE. The controller 120 repetitively updates a desired rotational speed "f" of the motor of the electrically-driven compressor 101 in response to the corrective rotational speed Δf. Specifically, a new desired rotational speed "f" is equal to the sum of an immediately-preceding desired rotational speed "f" and the corrective rotational speed Δf. The controller 120 adjusts the inverter 121 in response to the desired rotational speed "f" so that the actual rotational speed of the motor of the electrically-driven compressor 101 will be substantially equal to the desired rotational speed "f" thereof.

Figure 6:
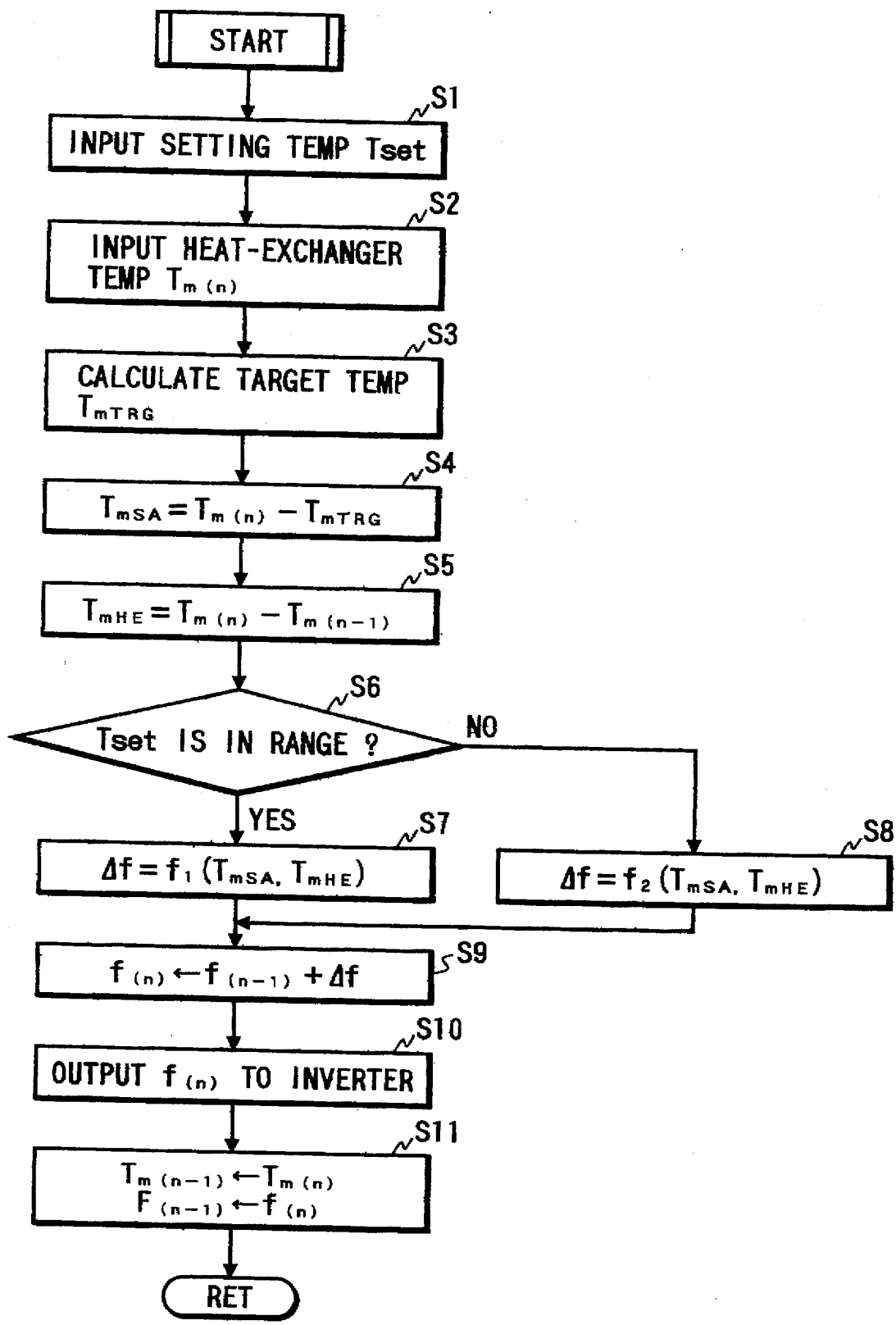
FIG. 6 is a flowchart of a segment of a program for controlling operation of the controller in FIG. 3.

As previously described, the controller 120 operates in accordance with a program stored in the internal ROM. FIG. 6 is a flowchart of a segment of the program which is iteratively executed at a given period equal to, for example, 10 seconds.

As shown in FIG. 6, a first step S1 of the program segment derives the desired temperature (the setting temperature) Tset within the vehicle interior from the output signal of the temperature setting device 114. A step S2 following the step S1 derives the current actual temperature Tm(n) of air downstream of the heat exchanger 110 by the output signal of the temperature sensor 129. A step 53 subsequent to the step S2 calculates a target temperature TmTRG of air downstream of the heat exchanger 110 from the desired temperature Tset. A step S4 following the step S3 calculates the difference TmSA between the target temperature TmTRG and the current actual temperature Tm(n). A step S5 subsequent to the step S4 calculates a variation TmHE in the actual temperature which occurs during the interval between the moment of the current execution cycle of the program segment and the moment of the immediately preceding execution cycle of the program segment. Specifically, the step S5 calculates the difference TmHE between the current actual temperature Tm(n) and the immediately preceding actual temperature Tm(n−1).

A step S6 following the step S5 decides whether or not the desired temperature (the setting temperature) Tset within the vehicle interior is in the given range between the temperature points T11 and T13 (see FIG. 5). When the desired temperature Tset is in the given range, the program advances from the step S6 to a step S7. Otherwise, the program advances from the step S6 to a step S8. The step S7 calculates a corrective rotational speed f1 of the motor of the electrically-driven compressor 101 from the temperature difference TmSA and the temperature variation TmHE by referring to a first predetermined relation thereamong. An example of the first predetermined relation is shown in FIG. 7. The step S7 sets a variable Δf equal to the corrective rotational speed f1. After the step S7, the program advances to a step S9. The step S8 calculates a corrective rotational speed f2 of the motor of the electrically-driven compressor 101 from the temperature difference TmSA and the temperature variation TmHE by referring to a second predetermined relation thereamong. An example of the second predetermined relation is shown in FIG. 8. The step S8 sets the variable Δf equal to the corrective rotational speed f2. After the step S8, the program advances to the step S9.

The step S9 adds the corrective rotational speed Δf to a desired rotational speed f(n−1) of the motor of the electrically-driven compressor 101 which is given in the immediately preceding execution cycle of the program segment. The step S9 sets a current desired rotational speed f(n) of the motor of the electrically-driven compressor 101 to the result of the addition. A step S10 following the step S9 outputs a signal representative of the current desired rotational speed f(n) to the inverter 121. Therefore, the inverter 121 is controlled in response to the current desired rotational speed f(n) so that the actual rotational speed of the motor of the electrically-driven compressor 101 will be substantially equal to the desired rotational speed f(n) thereof. A step S11 subsequent to the step S10 sets the value Tm(n−1) equal to the value Tm(n). In addition, the step S11 sets the value f(n−1) equal to the value f(n). After the step S11, the current execution cycle of the program segment ends.

A description will now be given of the case where the air conditioning apparatus is operated in the cooling mode under the following conditions. The cooling load is relatively small. The desired temperature (the setting temperature) Tset within the vehicle interior is equal to the lowest temperature T11 (see FIG. 5). The desired flow rate of air discharged via the outlet 108 into the vehicle interior is equal to the minimum rate (Lo). In this case, when the actual temperature Tm of air downstream of the heat exchanger 110 which is detected by the temperature sensor 129 drops below the target temperature TmTRG thereof, the controller 120 or the corrective-speed calculating block 119 in FIG. 4 decreases the rotational speed of the motor of the electrically-driven compressor 101 to raise the actual temperature Tm. Accordingly, the motor of the electrically-driven compressor 101 can be driven at a rotational speed optimal for equalizing the actual temperature Tm and the target temperature TmTRG. In this case, the target temperature TmTRG is equal to, for example, 2° C. Thus, the cooling ability of the air conditioning apparatus is prevented from excessively increasing. Further, it is possible to reduce the frequency of the occurrence of a freeze of the heat exchanger 110.

During the operation of the air conditioning apparatus in the cooling mode, the dehumidifying and heating mode, or the heating mode under various conditions of the thermal load on the air conditioning apparatus and the desired air flow rate, the motor of the electrically-driven compressor 101 can be driven at a rotational speed being responsive to the thermal load and being optimal for equalizing the actual temperature Tm and the target temperature TmTRG. Thus, the cooling ability or the heating ability of the air conditioning apparatus is prevented from excessively increasing. Further, it is possible to reduce the frequency of the occurrence of a freeze of the heat exchanger 110.

As previously described, the corrective rotational speed Δf of the motor of the electrically-driven compressor 101 is determined on the basis of the temperature difference TmSA and the temperature variation TmHE. This design enables the following processes. In the case where the actual temperature Tm of air downstream of the heat exchanger 110 considerably separates from the target temperature TmTRG thereof during a transition of conditions of the operation of the air conditioning apparatus, the rotational speed of the motor of the electrically-driven compressor 101 can promptly be increased to the maximum rotational speed. For example, in the case where the air conditioning apparatus is started to operate in the cooling mode and the cooling load is relatively great, the actual temperature Tm of air downstream of the heat exchanger 110 is considerably higher than the target temperature TmTRG thereof. When the temperature difference TmSA is "+great" and the temperature variation TmHE is "±small" (see FIG. 7), the corrective rotational speed Δf is set to "+great". Thus, for every given period, the desired rotational speed "f" of the motor of the electrically-driven compressor 101 is incremented by a large value corresponding to "+great" (the corrective rotational speed Δf equal to, for example, 10 Hz). Accordingly, the rotational speed of the motor of the electrically-driven compressor 101 can promptly be increased to the maximum rotational speed. The prompt increase in the rotational speed of the motor of the electrically-driven compressor 101 enables the actual temperature Tm of air downstream of the heat exchanger 110 to quickly reach the target temperature TmTRG thereof. In the case where the actual temperature Tm of air downstream of the heat exchanger 110 becomes close to the target temperature TmTRG thereof, the control of the rotational speed of the motor of the electrically-driven compressor 101 is changed at an early stage to suppress overshoot and hunting. For example, in the case where the actual temperature Tm of air downstream of the heat exchanger 110 becomes close to the target temperature TmTRG thereof during the operation of the air conditioning apparatus in the cooling mode, when the temperature difference TmSA drops to "+middle" and the temperature variation TmHE is "−great" (see FIG. 7), the corrective rotational speed Δf is set to "−small". Thus, the desired rotational speed "f" of the motor of the electrically-driven compressor 101 can be reduced at an early stage. Accordingly, it is possible to suppress overshoot and hunting in the control of the temperature Tm of air downstream of the heat exchanger 110.

Second Embodiment

Figure 9:
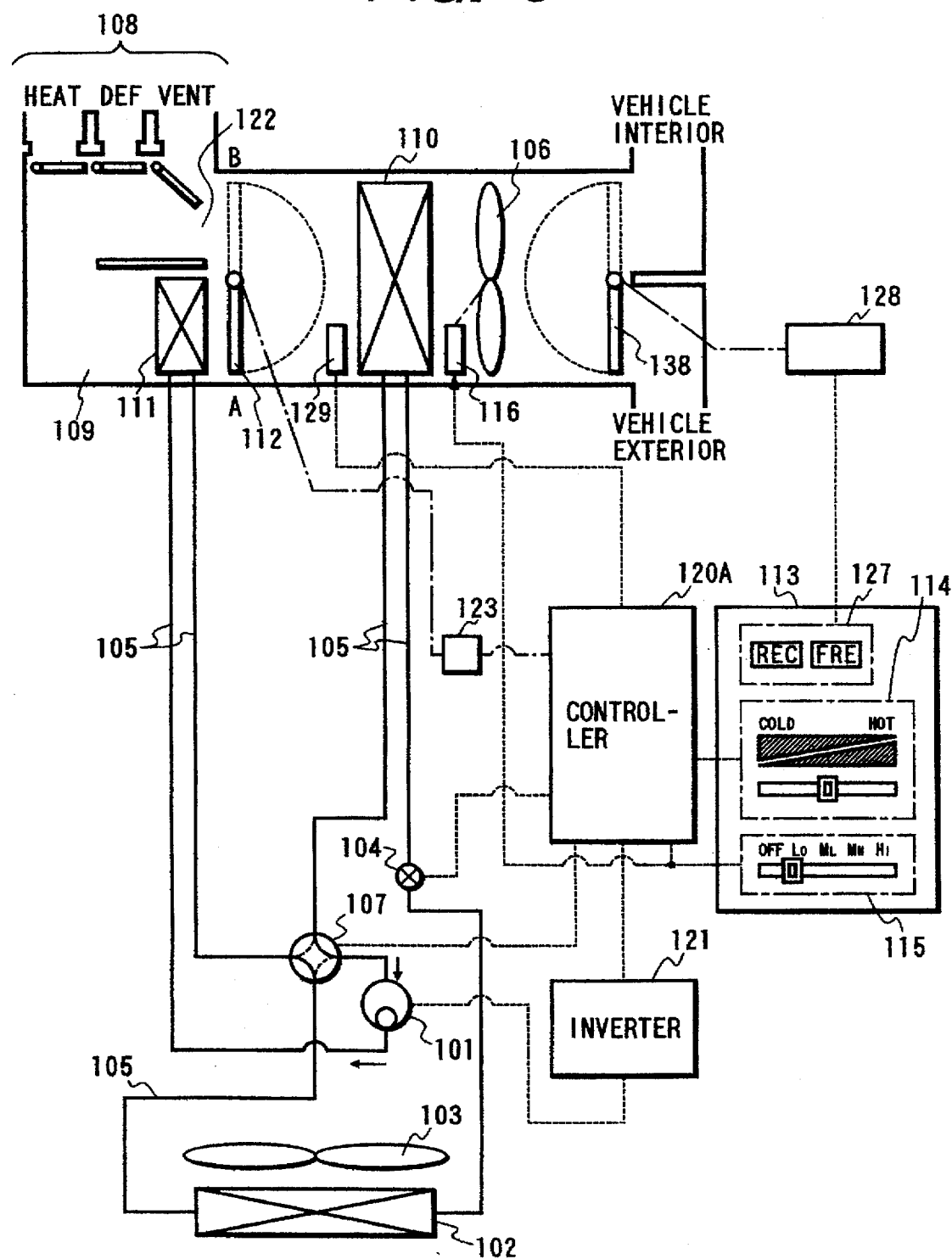
FIG. 9 is a diagram of an air conditioning apparatus for an electric vehicle according to a second embodiment of this invention.

FIG. 9 shows a second embodiment of this invention which is similar to the embodiment of FIGS. 3–8 except that a controller 120A replaces the controller 120 of FIG. 3.

The controller 120A includes a microcomputer or a similar device having a combination of a CPU, a ROM, a RAM, and an input/output port (an interface). The controller 120A is electrically connected to a refrigerant throttle valve 104, a four-way valve 107, a mix actuator 123, a temperature setting device 114, an air-flow-rate setting device 115, an inverter 121, and a temperature sensor 129. The controller 120A operates in accordance with a program stored in the internal ROM. According to the program, the controller 120A controls the refrigerant throttle valve 104, the four-way valve 107, the mix actuator 123, and the inverter 121 in response to a desired temperature (a setting temperature) set by the temperature setting device 114, a desired air flow rate set by the air-flow-rate setting device 115, and a temperature detected by the temperature sensor 129.

Figure 10:
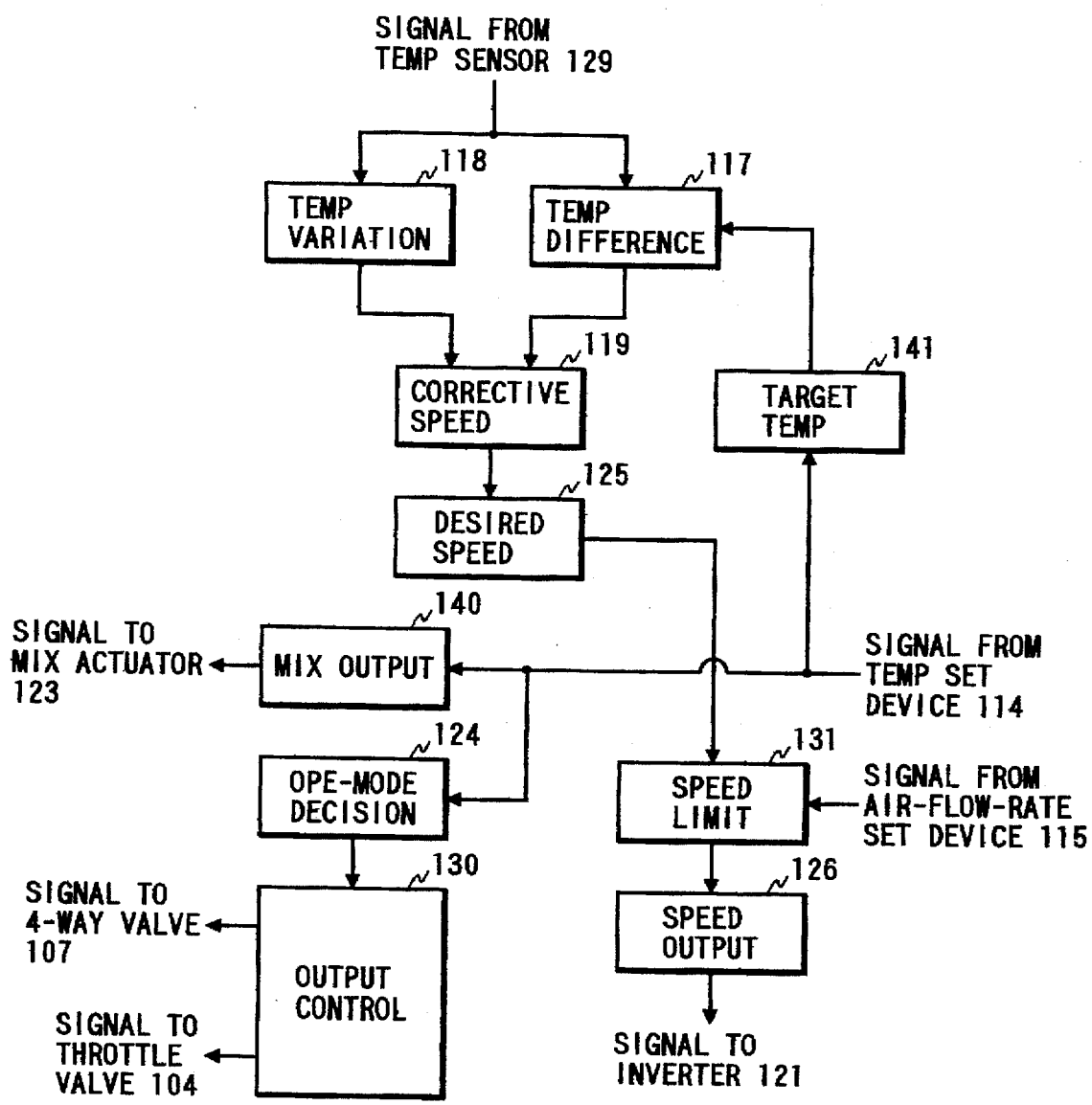
FIG. 10 is a flow diagram of operation of a controller in FIG. 9.
Figure 11:
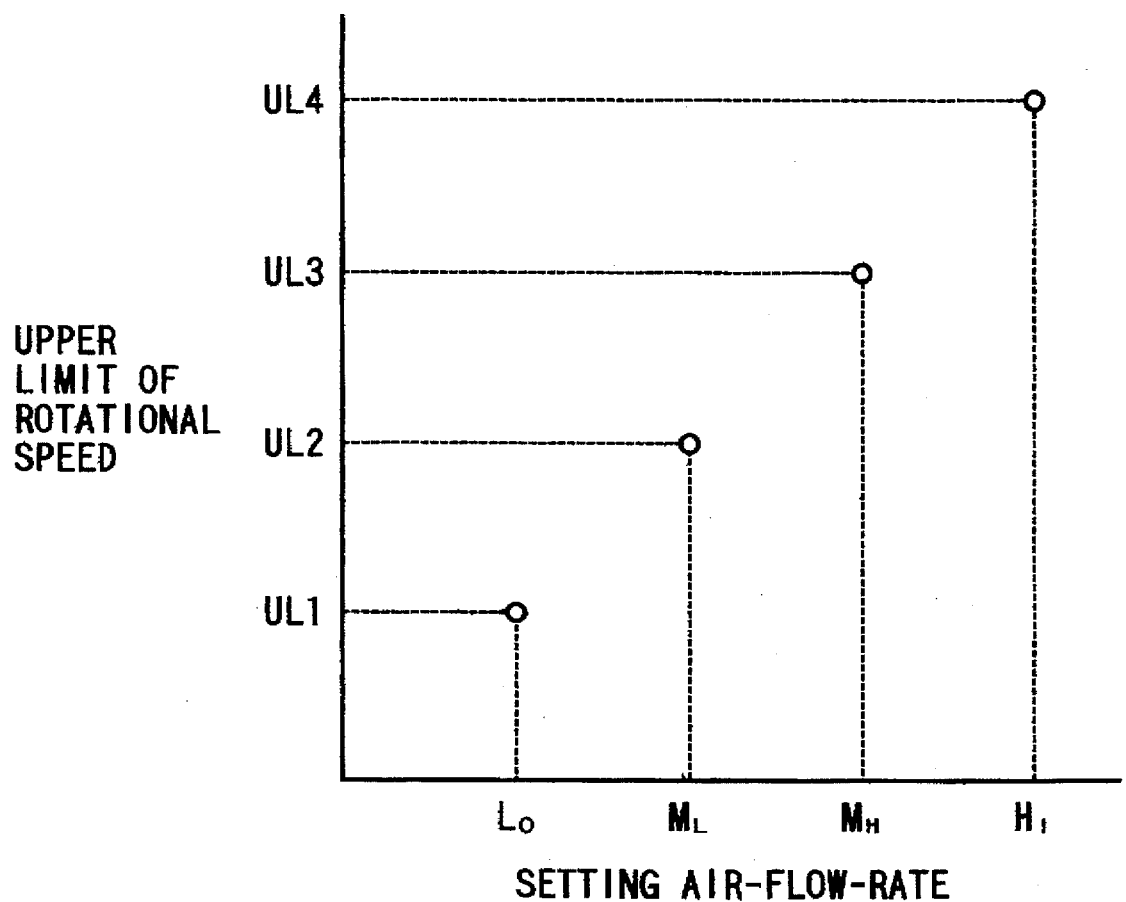
FIG. 11 is a diagram of a relation between a desired rotational speed of a motor of an electrically-driven compressor and a desired air flow rate given by an air-flow-rate setting device in the apparatus of FIG. 9.

FIG. 10 is a flow diagram of operation of the controller 120A. With reference to FIG. 10, a desired-speed calculating block 125 is followed by a limiting block 131. The limiting block 131 is informed of a desired rotational speed of the motor of an electrically-driven compressor 101 which is given by the desired-speed calculating block 125. In addition, the limiting block 131 is informed of the desired air flow rate given by the air-flow-rate setting device 115. The limiting block 131 calculates an upper limit of the desired rotational speed of the motor of the electrically-driven compressor 101 from the desired air flow rate given by the air-flow-rate setting device 115. As shown in FIG. 11, the calculated upper limit is equal to a lowest preset rotational speed UL1 when the desired air flow rate corresponds to a lowest rate Lo. The calculated upper limit is equal to a second lowest preset rotational speed UL2 when the desired air flow rate corresponds to a lower middle rate ML. The calculated upper limit is equal to a second highest preset rotational speed UL3 when the desired air flow rate corresponds to a higher middle rate MH. The calculated upper limit is equal to a highest preset rotational speed UL4 when the desired air flow rate corresponds to a highest rate Hi. When the desired rotational speed of the motor of the electrically-driven compressor 101 is equal to or lower than the calculated upper limit, the limiting block 131 holds the desired rotational speed unchanged. In other words, the limiting block 131 does not change the desired rotational speed. On the other hand, when the desired rotational speed of the motor of the electrically-driven compressor 101 exceeds the calculated upper limit, the limiting block 131 sets or reduces the desired rotational speed to the calculated upper limit. In this way, the limiting block 131 limits the upper side of the desired rotational speed in response to the desired air flow rate. A speed outputting block 126 is informed of the desired rotational speed of the motor of the electrically-driven compressor 101 which is given by the limiting block 131. The speed outputting block 126 outputs information of the desired rotational speed to the inverter 121. Accordingly, the inverter 121 is adjusted in response to the desired rotational speed so that the actual rotational speed of the motor of the electrically-driven compressor 101 will be substantially equal to the desired rotational speed thereof.

A description will now be given of the case where an air conditioning apparatus is operated in a cooling mode under the following conditions. The cooling load is relatively small. A desired temperature (a setting temperature) Tset within a vehicle interior is equal to a lowest temperature T11 (see FIG. 5). The desired flow rate of air discharged via an outlet 108 into the vehicle interior is equal to the minimum rate (Lo). In this case, when an actual temperature Tm of air downstream of a heat exchanger 110 which is detected by the temperature sensor 129 is considerably higher than a target temperature TmTRG thereof, the controller 120A increases the rotational speed of the motor of the electrically-driven compressor 101 to drop the actual temperature Tm. At the same time, the controller 120A limits the desired rotational speed of the motor of the electrically-driven compressor 101 to within the range equal to or smaller than the upper limit UL1 (see FIG. 11). Accordingly, during a certain time interval following the start of the air conditioning apparatus, the motor of the electrically-driven compressor 101 generally remains driven at a given speed corresponding to the upper limit UL1. The upper limit UL1 is equal to, for example, 50 Hz. Thus, the cooling ability of the air conditioning apparatus is prevented from excessively increasing.

A description will now be given of the case where the air conditioning apparatus is operated in a heating mode under the following conditions. The heating load is relatively small. The desired temperature (the setting temperature) Tset within the vehicle interior is equal to a highest temperature T14 (see FIG. 5). The desired flow rate of air discharged via the outlet 108 into the vehicle interior is equal to the maximum rate (Hi). In this case, when the actual temperature Tm of air downstream of the heat exchanger 110 which is detected by the temperature sensor 129 is considerably lower than the target temperature TmTRG thereof, the controller 120A increases the rotational speed of the motor of the electrically-driven compressor 101 to raise the actual temperature Tm. At the same time, the controller 120A limits the desired rotational speed of the motor of the electrically-driven compressor 101 to within the range equal to or smaller than the upper limit UL4 (see FIG. 11). Accordingly, during a certain time interval following the start of the air conditioning apparatus, the motor of the electrically-driven compressor 101 generally remains driven at a given speed corresponding to the upper limit UL4. Thus, the heating ability of the air conditioning apparatus is prevented from excessively increasing.

Third Embodiment

Figure 12:
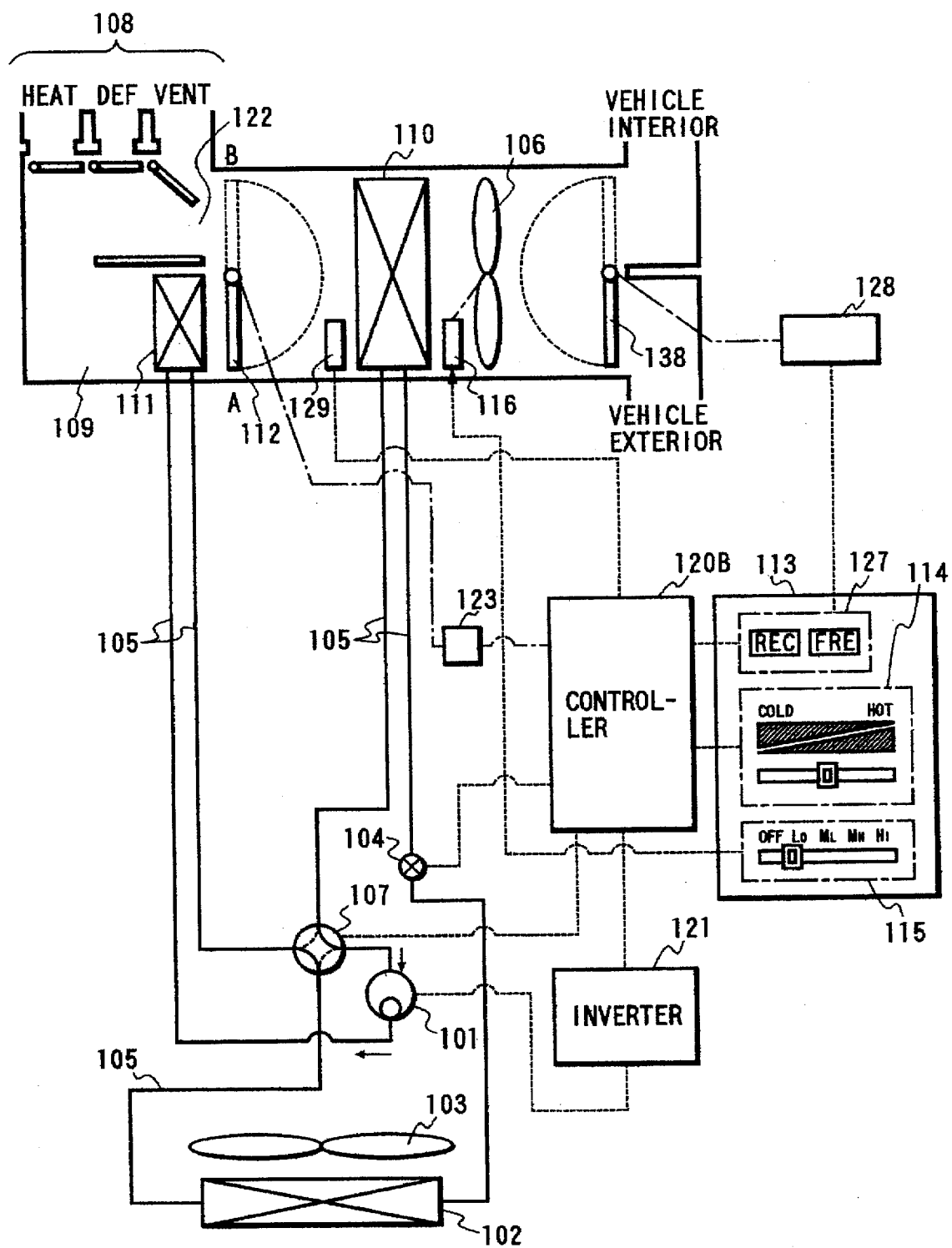
FIG. 12 is a diagram of an air conditioning apparatus for an electric vehicle according to a third embodiment of this invention.

FIG. 12 shows a third embodiment of this invention which is similar to the embodiment of FIGS. 3–8 except that a controller 120B replaces the controller 120 of FIG. 3.

The controller 120B includes a microcomputer or a similar device having a combination of a CPU, a ROM, a RAM, and an input/output port (an interface). The controller 120B is electrically connected to a refrigerant throttle valve 104, a four-way valve 107, a mix actuator 123, a temperature setting device 114, an inverter 121, an intake air selector 127, and a temperature sensor 129. The controller 120B operates in accordance with a program stored in the internal ROM. According to the program, the controller 120B controls the refrigerant throttle valve 104, the four-way valve 107, the mix actuator 123, and the inverter 121 in response to a desired temperature (a setting temperature) set by the temperature setting device 114, the position or the state of the intake air selector 127, and a temperature detected by the temperature sensor 129.

Figure 13:
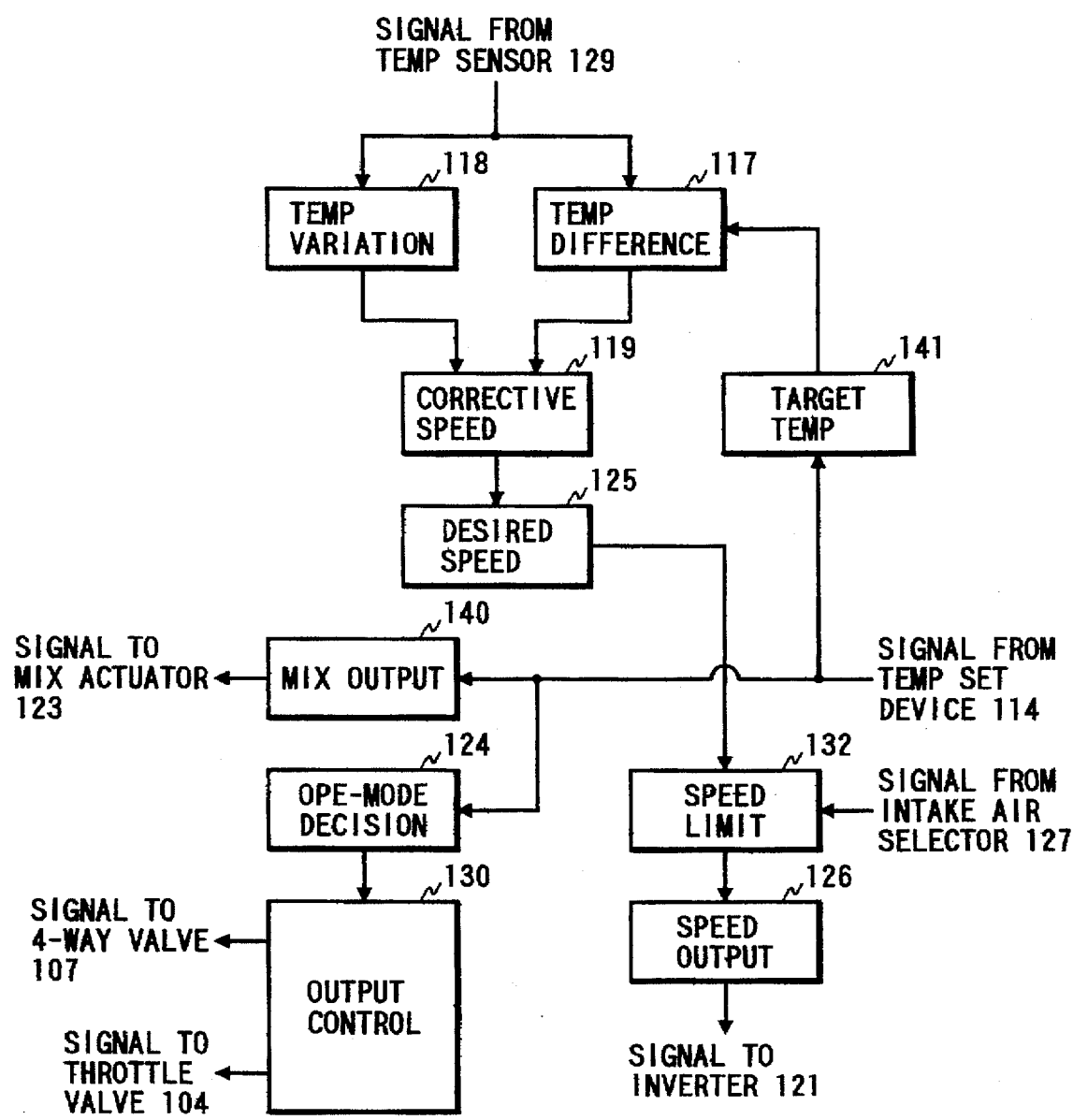
FIG. 13 is a flow diagram of operation of a controller in FIG. 12.

FIG. 13 is a flow diagram of operation of the controller 120B. With reference to FIG. 13, a desired-speed calculating block 125 is followed by a limiting block 132. The limiting block 132 is informed of a desired rotational speed of the motor of an electrically-driven compressor 101 which is given by the desired-speed calculating block 125. In addition, the limiting block 132 is informed of the position or the state of the intake air selector 127. Only when the position or the state of the intake air selector 127 corresponds to fresh air introduction, the limiting block 132 sets an upper limit of the desired rotational speed of the motor of the electrically-driven compressor 101. The upper limit is equal to, for example, 50 Hz. In the case where the position or the state of the intake air selector 127 corresponds to the fresh air introduction, when the desired rotational speed of the motor of the electrically-driven compressor 101 is equal to or lower than the upper limit, the limiting block 132 holds the desired rotational speed unchanged. In other words, the limiting block 132 does not change the desired rotational speed. On the other hand, when the desired rotational speed of the motor of the electrically-driven compressor 101 exceeds the upper limit, the limiting block 132 sets or reduces the desired rotational speed to the upper limit. In this way, the limiting block 132 limits the upper side of the desired rotational speed. In the case where the position or the state of the intake air selector 127 disagrees with the fresh air introduction, the limiting block 132 does not limit the desired rotational speed. A speed outputting block 126 is informed of the desired rotational speed of the motor of the electrically-driven compressor 101 which is given by the limiting block 132. The speed outputting block 126 outputs information of the desired rotational speed to the inverter 121. Accordingly, the inverter 121 is adjusted in response to the desired rotational speed so that the actual rotational speed of the motor of the electrically-driven compressor 101 will be substantially equal to the desired rotational speed thereof.

A description will now be given of the case where an air conditioning apparatus is operated in a cooling mode under the following conditions. The cooling load is relatively small. The position or the state of the intake air selector 127 corresponds to the fresh air introduction. In this case, the pressure at the inlet of the electrically-driven compressor 101 tends to rise. As previously described, when the position or the state of the intake air selector 127 corresponds to the fresh air introduction, the controller 120B or the limiting block 132 in FIG. 13 limits the desired rotational speed of the motor of the electrically-driven compressor 101 to within the range equal to or smaller than the upper limit (for example, 50 Hz). Accordingly, the pressure at the outlet of the electrically-driven compressor 101 is prevented from excessively rising.

Fourth Embodiment

Figure 14:
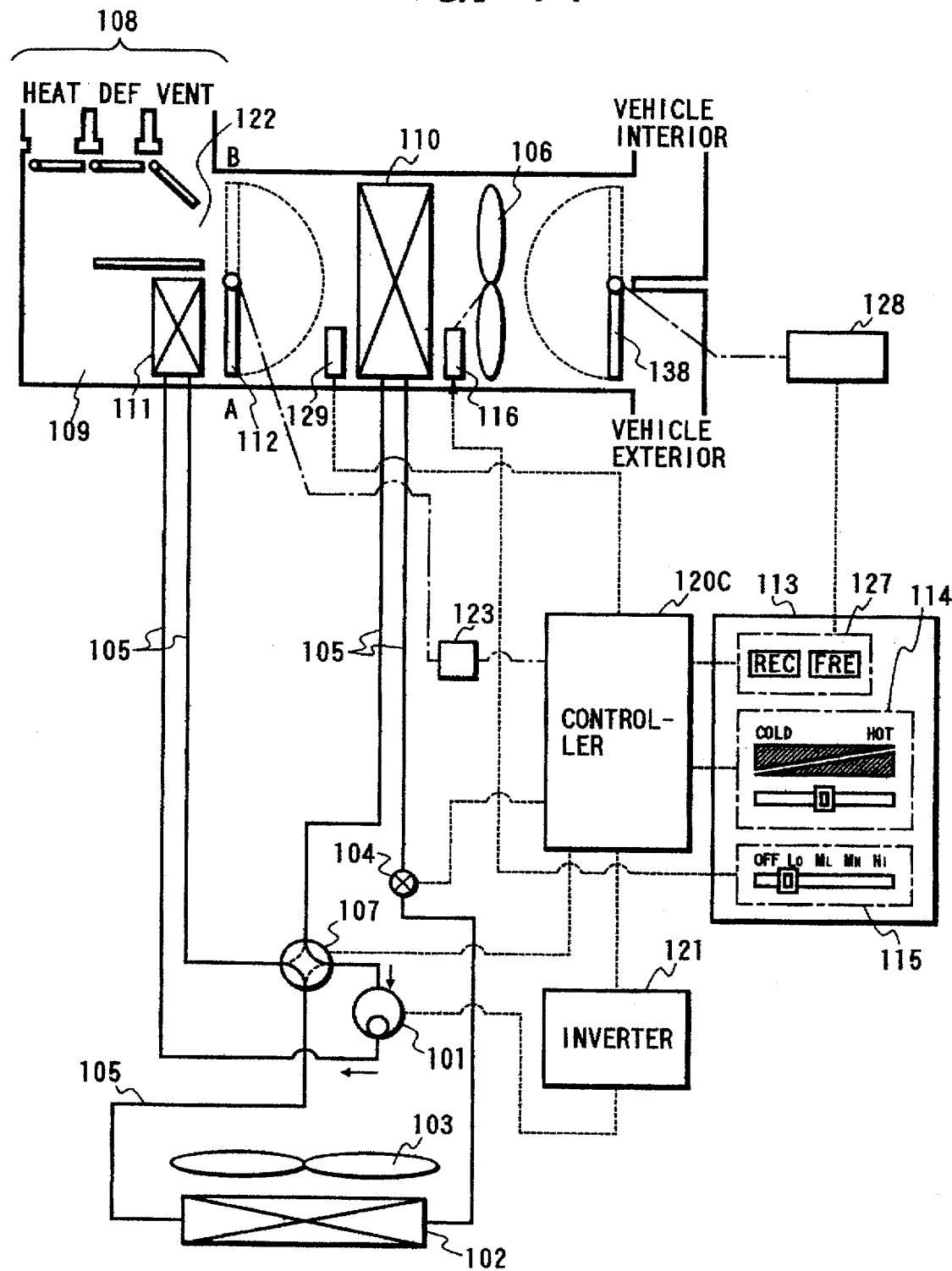
FIG. 14 is a diagram of an air conditioning apparatus for an electric vehicle according to a fourth embodiment of this invention.

FIG. 14 shows a fourth embodiment of this invention which is similar to the embodiment of FIGS. 3–8 except that a controller 120C replaces the controller 120 of FIG. 3.

The controller 120C includes a microcomputer or a similiar device having a combination of a CPU, a ROM, a RAM, and an input/output port (an interface). The controller 120C is electrically connected to a refrigerant throttle valve 104, a four-way valve 107, a mix actuator 123, a temperature setting device 114, an inverter 121, an intake air selector 127, and a temperature sensor 129. The controller 120C operates in accordance with a program stored in the internal ROM. According to the program, the controller 120C controls the refrigerant throttle valve 104, the four-way valve 107, the mix actuator 123, and the inverter 121 in response to a desired temperature (a setting temperature) set by the temperature setting device 114, the position or the state of the intake air selector 127, and a temperature detected by the temperature sensor 129.

Figure 15:
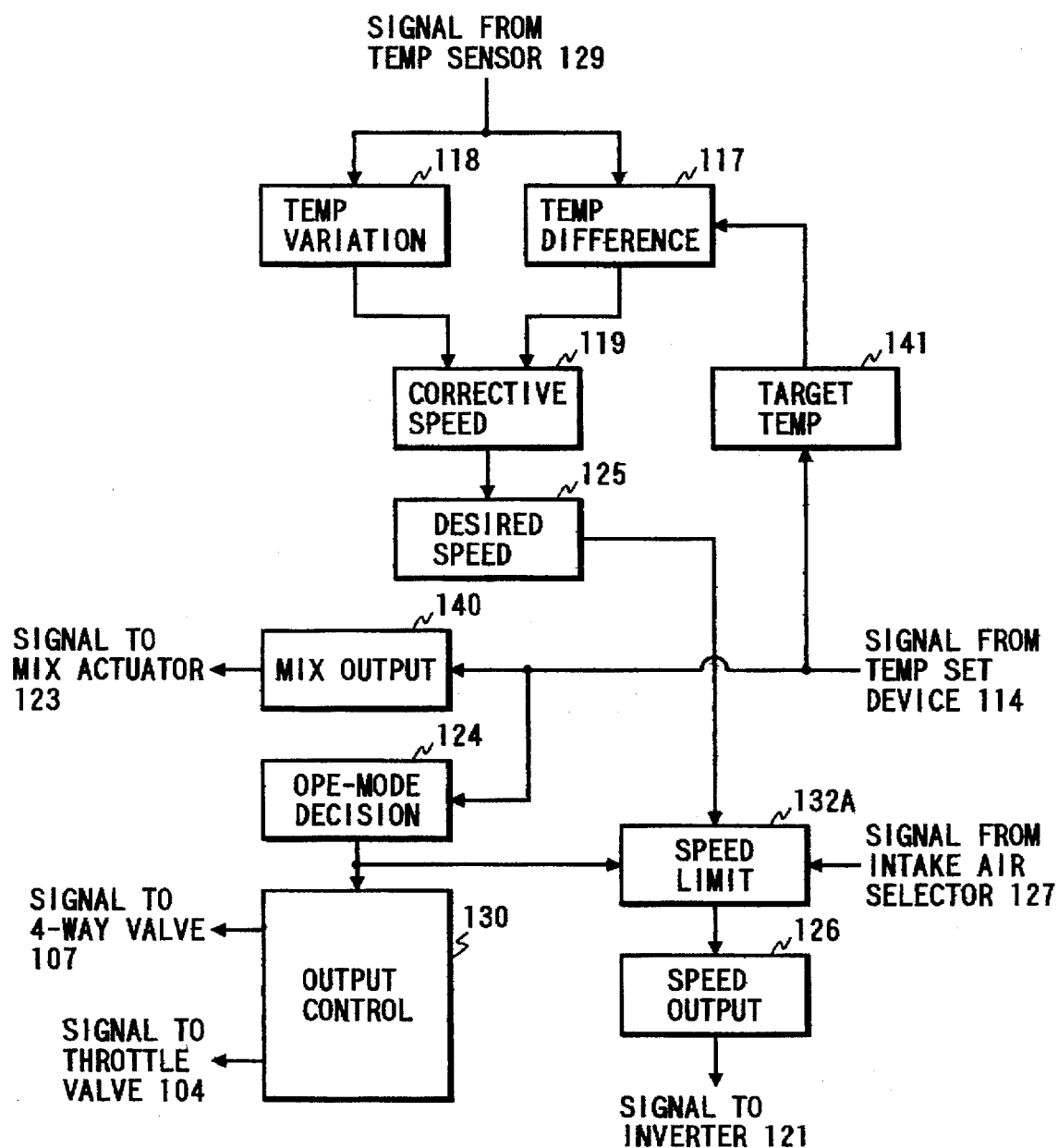
FIG. 15 is a flow diagram of operation of a controller in FIG. 14.

FIG. 15 is a flow diagram of operation of the controller 120C. With reference to FIG. 15, a desired-speed calculating block 125 is followed by a limiting block 132A. The limiting block 132A is informed of a desired rotational speed of the motor of an electrically-driven compressor 101 which is given by the desired-speed calculating block 125. In addition, the limiting block 132A is informed of the position or the state of the intake air selector 127. Further, an operation-mode deciding block 124 informs the limiting block 132A of the result of a decision as to a desired mode of operation of an air conditioning apparatus. The limiting block 132A limits the upper side of the desired rotational speed in response to the position or the state of the intake air selector 127 and the result of the decision as to the desired mode of operation of the air conditioning apparatus. Specifically, when the desired mode of operation of the air conditioning apparatus agrees with a cooling mode and the position or the state of the intake air selector 127 corresponds to fresh air introduction, the limiting block 132A sets an upper limit of the desired rotational speed of the motor of the electrically-driven compressor 101. The upper limit is equal to, for example, 50 Hz. Also, when the desired mode of operation of the air conditioning apparatus agrees with a heating mode and the position or the state of the intake air selector 127 corresponds to air recirculation (indoor air introduction), the limiting block 132A sets the upper limit of the desired rotational speed of the motor of the electrically-driven compressor 101. In these upper-limit setting cases, when the desired rotational speed of the motor of the electrically-driven compressor 101 is equal to or lower than the upper limit, the limiting block 132A holds the desired rotational speed unchanged. In other words, the limiting block 132A does not change the desired rotational speed. On the other hand, when the desired rotational speed of the motor of the electrically-driven compressor 101 exceeds the upper limit, the limiting block 132A sets or reduces the desired rotational speed to the upper limit. In this way, the limiting block 132A limits the upper side of the desired rotational speed. In other cases, the limiting block 132A does not limit the desired rotational speed. A speed outputting block 126 is informed of the desired rotational speed of the motor of the electrically-driven compressor 101 which is given by the limiting block 132A. The speed outputting block 126 outputs information of the desired rotational speed to the inverter 121. Accordingly, the inverter 121 is adjusted in response to the desired rotational speed so that the actual rotational speed of the motor of the electrically-driven compressor 101 will be substantially equal to the desired rotational speed thereof.

A description will now be given of the case where the air conditioning apparatus is operated in the cooling mode under the following conditions. The cooling load is relatively great. The position or the state of the intake air selector 127 corresponds to the fresh air introduction. In this case, the pressure at the inlet of the electrically-driven compressor 101 tends to rise. As previously described, when the desired mode of operation of the air conditioning apparatus agrees with the cooling mode and the position or the state of the intake air selector 127 corresponds to the fresh air introduction, the controller 120C or the limiting block 132A in FIG. 15 limits the desired rotational speed of the motor of the electrically-driven compressor 101 to within the range equal to or smaller than the upper limit (for example, 50 Hz). Accordingly, the pressure at the outlet of the electrically-driven compressor 101 is prevented from excessively rising.

A description will now be given of the case where the air conditioning apparatus is operated in the heating mode under the following conditions. The heating load is relatively small. The position or the state of the intake air selector 127 corresponds to the air recirculation (the indoor air introduction). In this case, the pressure at the inlet of the electrically-driven compressor 101 tends to rise. As previously described, when the desired mode of operation of the air conditioning apparatus agrees with the heating mode and the position or the state of the intake air selector 127 corresponds to the air recirculation (the indoor air introduction), the controller 120C or the limiting block 132A in FIG. 15 limits the desired rotational speed of the motor of the electrically-driven compressor 101 to within the range equal to or smaller than the upper limit (for example, 50 Hz). Accordingly, the pressure at the outlet of the electrically-driven compressor 101 is prevented from excessively rising.

Fifth Embodiment

Figure 16:
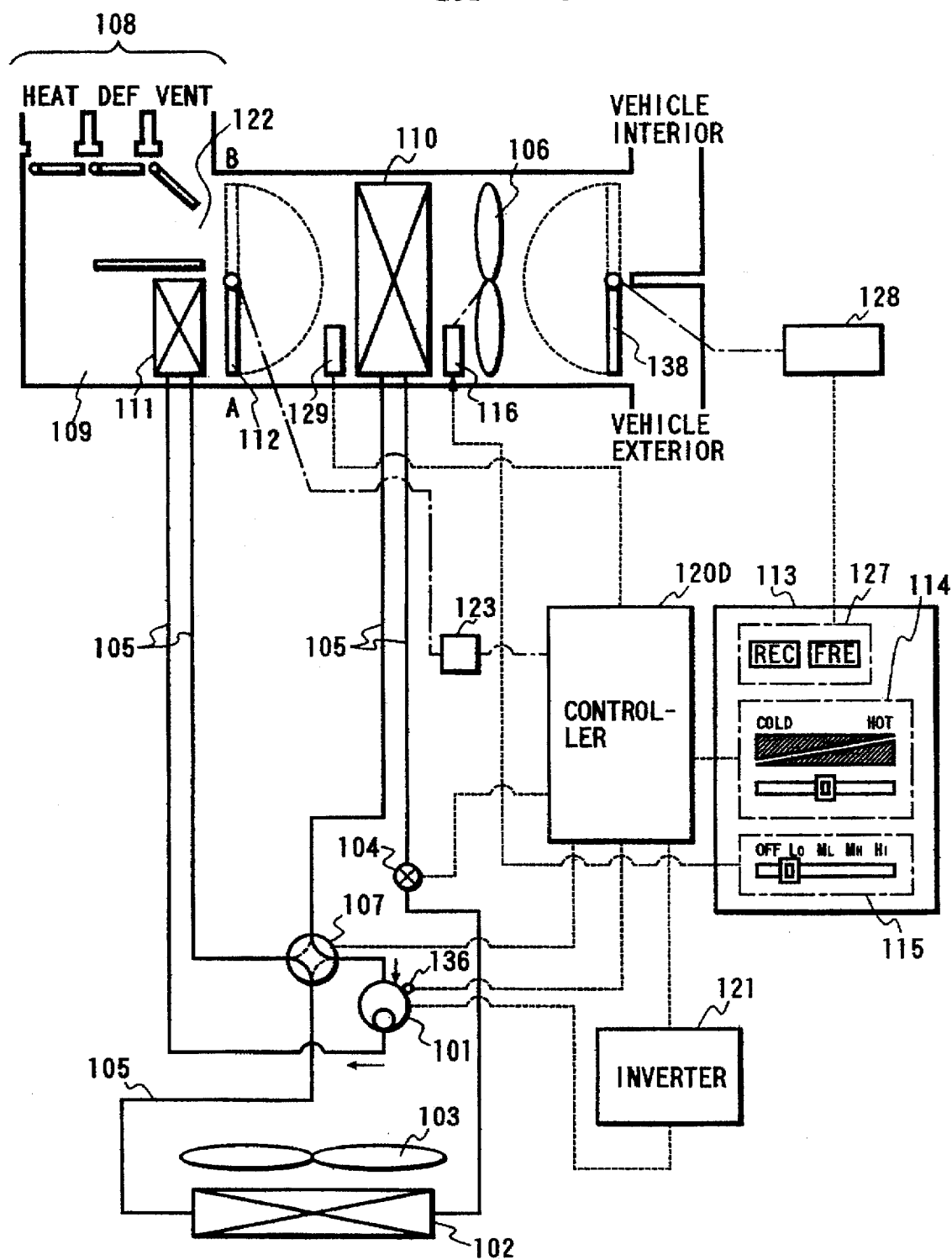
FIG. 16 is a diagram of an air conditioning apparatus for an electric vehicle according to a fifth embodiment of this invention.

FIG. 16 shows a fifth embodiment of this invention which is similar to the embodiment of FIGS. 3–8 except that a controller 120D replaces the controller 120 of FIG. 3, and that a temperature sensor 136 is additionally provided which detects the temperature of a motor winding of an electrically-driven compressor 101.

The controller 120D includes a microcomputer or a similar device having a combination of a CPU, a ROM, a RAM, and an input/output port (an interface). The controller 120D is electrically connected to a refrigerant throttle valve 104, a four-way valve 107, a mix actuator 123, a temperature setting device 114, an inverter 121, a temperature sensor 129, and the temperature sensor 136. The controller 120D operates in accordance with a program stored in the internal ROM. According to the program, the controller 120D controls the refrigerant throttle valve 104, the four-way valve 107, the mix actuator 123, and the inverter 121 in response to a desired temperature (a setting temperature) set by the temperature setting device 114, a temperature detected by the temperature sensor 129, and the temperature detected by the temperature sensor 136.

Figure 17:
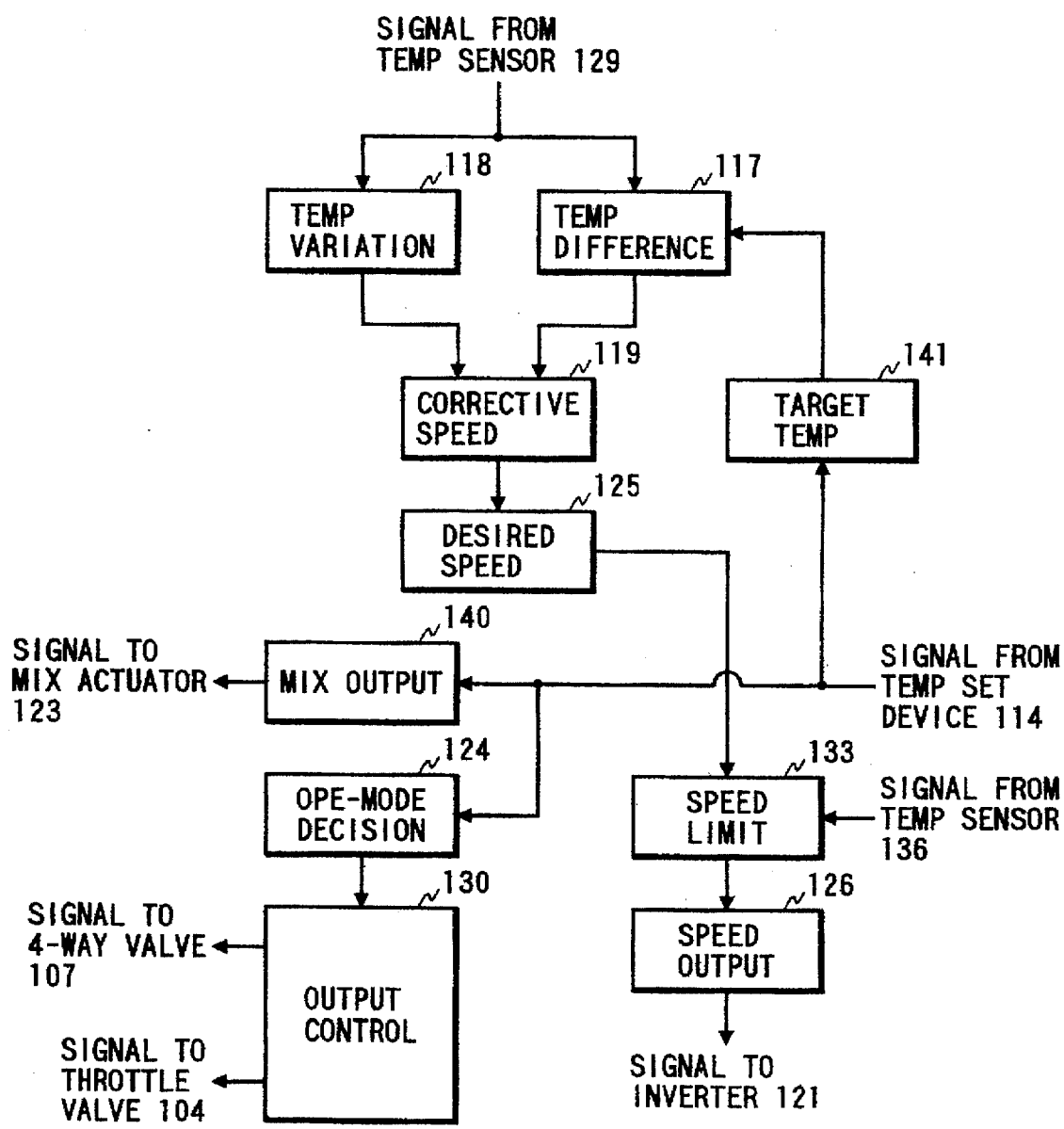
FIG. 17 is a flow diagram of operation of a controller in FIG. 16.
Figure 18:
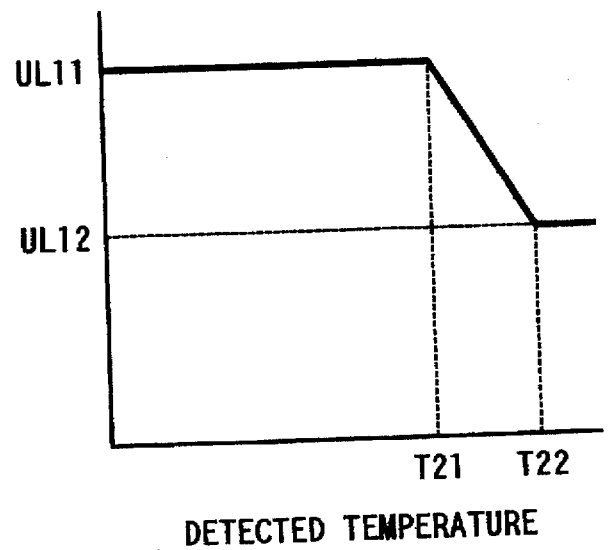
FIG. 18 is a diagram of a relation between an upper limit of the rotational speed of a motor of an electrically-driven compressor and a detected temperature of a motor winding of the electrically-driven compressor in the apparatus of FIG. 16.

FIG. 17 is a flow diagram of operation of the controller 120D. With reference to FIG. 17, a desired-speed calculating block 125 is followed by a limiting block 133. The limiting block 133 is informed of a desired rotational speed of the motor of the electrically-driven compressor 101 which is given by the desired-speed calculating block 125. In addition, the temperature sensor 136 informs the limiting block 133 of the temperature of the motor winding of the electrically-driven compressor 101. The limiting block 133 limits the upper side of the desired rotational speed in response to the temperature of the motor winding of the electrically-driven compressor 101. Specifically, the limiting block 133 calculates an upper limit of the desired rotational speed of the motor of the electrically-driven compressor 101 from the temperature of the motor winding of the electrically-driven compressor 101. As shown in FIG. 18, the calculated upper limit is equal to a highest preset rotational speed UL11 when the temperature of the motor winding of the electrically-driven compressor 101 is equal to or lower than a first preset temperature point T21. The calculated upper limit falls from the highest preset rotational speed UL11 to a lowest preset rotational speed UL12 as the temperature of the motor winding of the electrically-driven compressor 101 rises from the first preset temperature point T21 to a second preset temperature point T22. The calculated upper limit is equal to the lowest preset rotational speed UL12 when the temperature of the motor winding of the electrically-driven compressor 101 is equal to or higher than the second preset temperature point T22. The second present temperature point T22 is equal to, for example, 120° C. The lowest preset rotational speed UL12 is equal to, for example, 50 Hz. When the desired rotational speed of the motor of the electrically-driven compressor 101 is equal to or lower than the upper limit, the limiting block 133 holds the desired rotational speed unchanged. In other words, the limiting block 133 does not change the desired rotational speed. On the other hand, when the desired rotational speed of the motor of the electrically-driven compressor 101 exceeds the upper limit, the limiting block 133 sets or reduces the desired rotational speed to the upper limit. In this way, the limiting block 133 limits the upper side of the desired rotational speed. A speed outputting block 126 is informed of the desired rotational speed of the motor of the electrically-driven compressor 101 which is given by the limiting block 133. The speed outputting block 126 outputs information of the desired rotational speed to the inverter 121. Accordingly, the inverter 121 is adjusted in response to the desired rotational speed so that the actual rotational speed of the motor of the electrically-driven compressor 101 will be substantially equal to the desired rotational speed thereof.

A description will now be given of the case where the air conditioning apparatus is operated in the cooling mode under the following conditions. The cooling load is relatively great. The position or the state of an intake air selector 127 corresponds to fresh air introduction. In this case, the pressure at the inlet of the electrically-driven compressor 101 tends to rise. Generally, the temperature of the motor winding of the electrically-driven compressor 101 increases in accordance with the rise in the pressure at the inlet of the electrically-driven compressor 101. As previously described, the controller 120D or the limiting block 133 in FIG. 17 limits the desired rotational speed of the motor of the electrically-driven compressor 101 to within the range equal to or smaller than the upper limit (for example, 50 Hz). Accordingly, the pressure at the outlet of the electrically-driven compressor 101 is prevented from excessively rising. In addition, the temperature of the motor winding of the electrically-driven compressor 101 is prevented from excessively increasing.

A description will now be given of the case where the air conditioning apparatus is operated in the heating mode under the following conditions. The heating load is relatively small. Air in a vehicle interior is sufficiently warm. The position or the state of the intake air selector 127 corresponds to air recirculation (indoor air introduction). In this case, the pressure at the inlet of the electrically-driven compressor 101 tends to rise. Generally, the temperature of the motor winding of the electrically-driven compressor 101 increases in accordance with the rise in the pressure at the inlet of the electrically-driven compressor 101. As previously described, the controller 120D or the limiting block 133 in FIG. 17 limits the desired rotational speed of the motor of the electrically-driven compressor 101 to within the range equal to or smaller than the upper limit (for example, 50 Hz). Accordingly, the pressure at the outlet of the electrically-driven compressor 101 is prevented from excessively rising. In addition, the temperature of the motor winding of the electrically-driven compressor 101 is prevented from excessively increasing.

Sixth Embodiment

Figure 19:
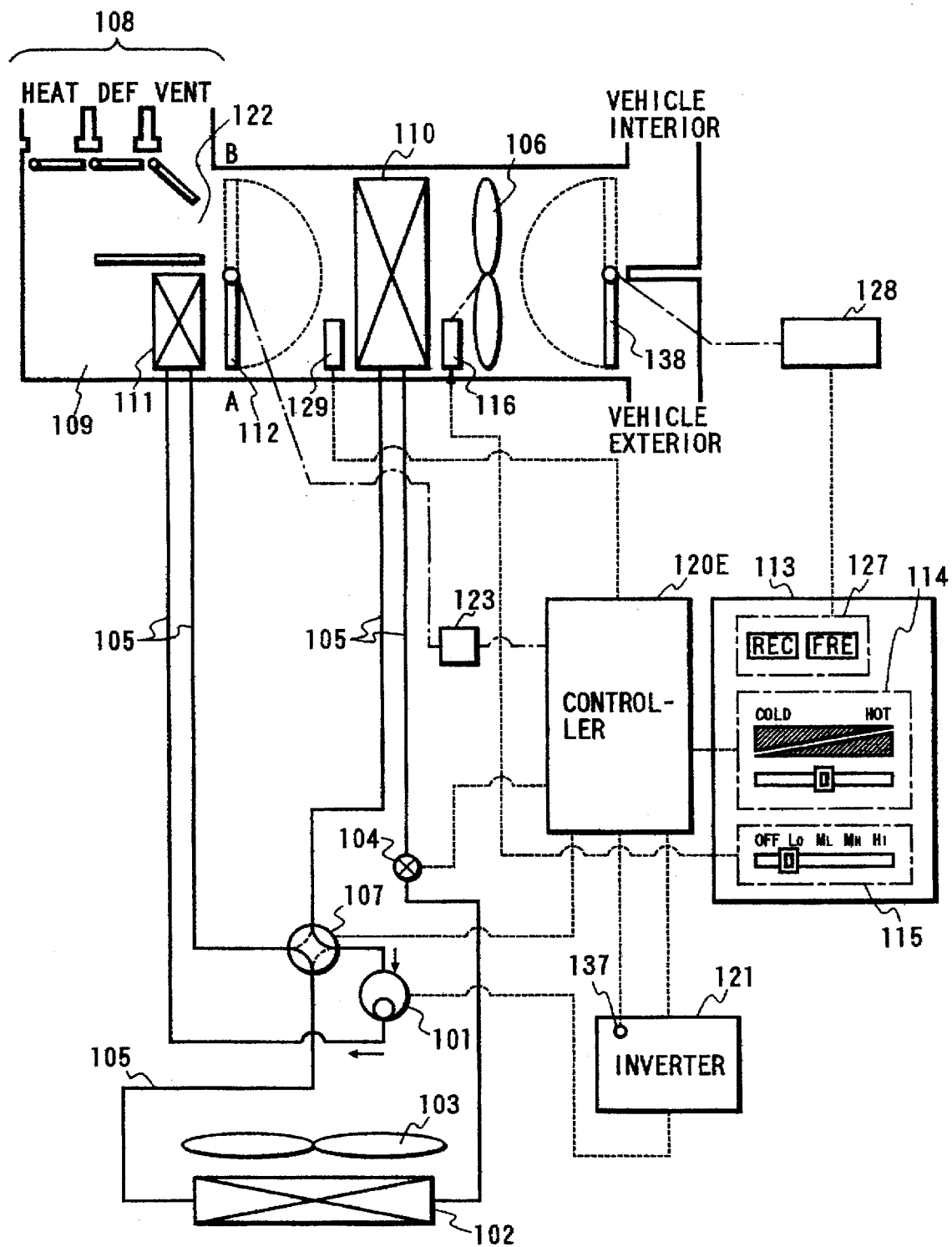
FIG. 19 is a diagram of an air conditioning apparatus for an electric vehicle according to a sixth embodiment of this invention.

FIG. 19 shows a sixth embodiment of this invention which is similar to the embodiment of FIGS. 3–8 except that a controller 120E replaces the controller 120 of FIG. 3, and that a temperature sensor 137 is additionally provided which detects the temperature of a drive portion of an inverter 121. The drive portion of the inverter 121 includes, for example, transistors.

The controller 120E includes a microcomputer or a similar device having a combination of a CPU, a ROM, a RAM, and an input/output port (an interface). The controller 120E is electrically connected to a refrigerant throttle valve 104, a four-way valve 107, a mix actuator 123, a temperature setting device 114, the inverter 121, a temperature sensor 129, and the temperature sensor 137. The controller 120E operates in accordance with a program stored in the internal ROM. According to the program, the controller 120E controls the refrigerant throttle valve 104, the four-way valve 107, the mix actuator 123, and the inverter 121 in response to a desired temperature (a setting temperature) set by the temperature setting device 114, a temperature detected by the temperature sensor 129, and the temperature detected by the temperature sensor 137.

Figure 21:
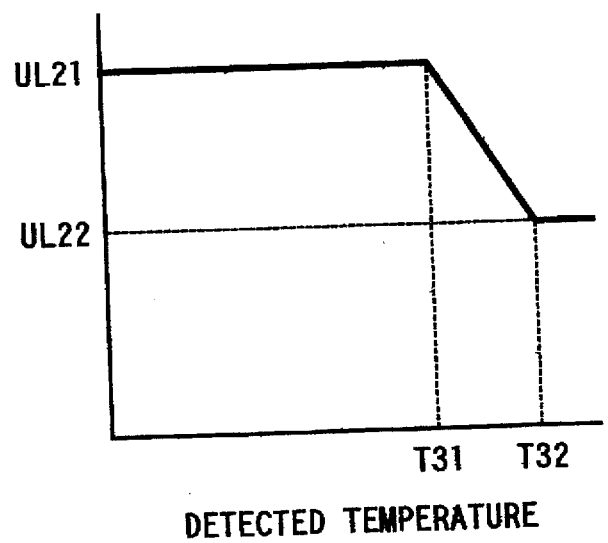
FIG. 21 is a diagram of a relation between an upper limit of the rotational speed of a motor of an electrically-driven compressor and a detected temperature of a drive portion of an inverter in the apparatus of FIG. 19.
Figure 20:
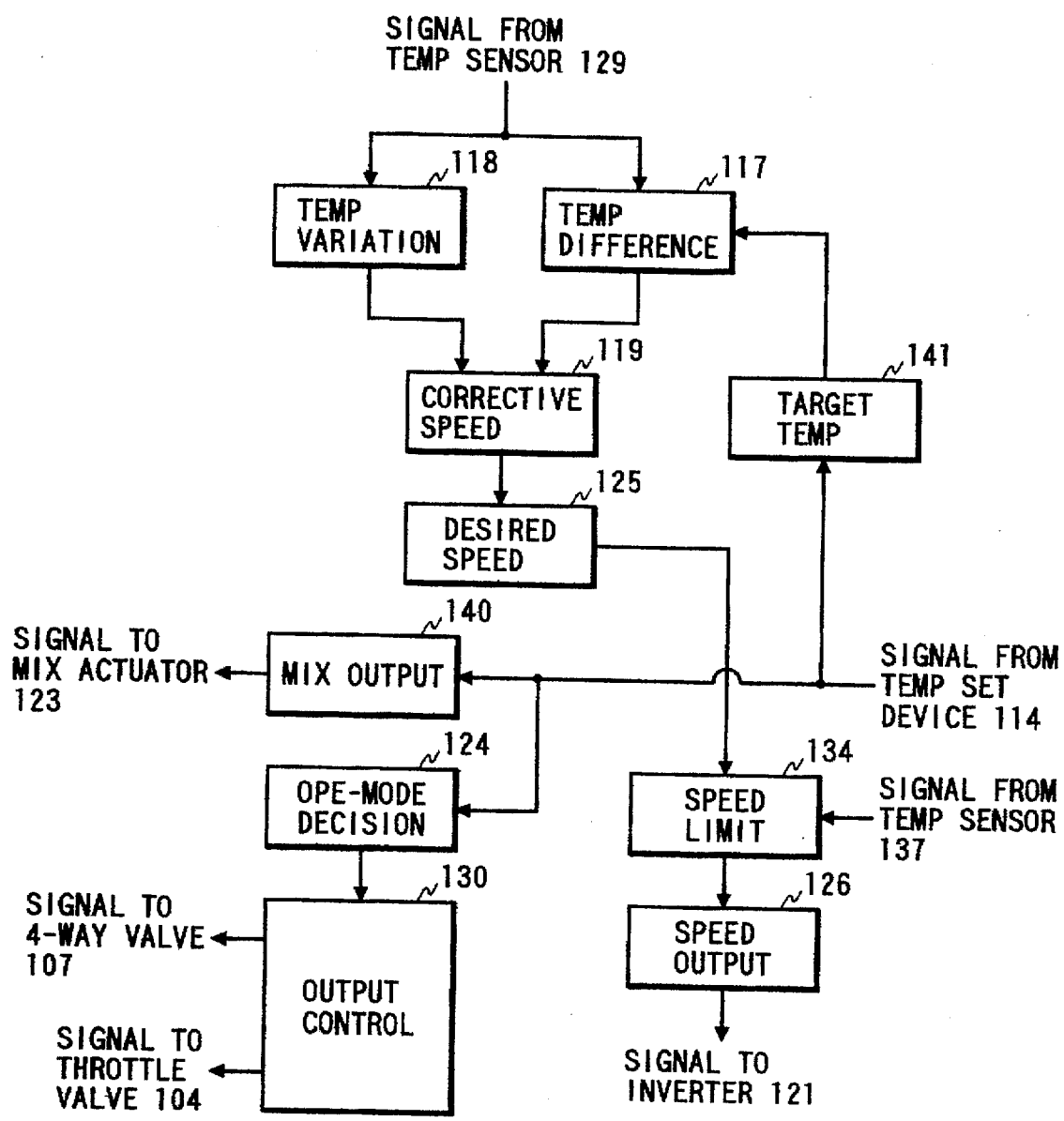
FIG. 20 is a flow diagram of operation of a controller in FIG. 19.

FIG. 20 is a flow diagram of operation of the controller 120E. With reference to FIG. 20, a desired-speed calculating block 125 is followed by a limiting block 134. The limiting block 134 is informed of the desired rotational speed of the motor of the electrically-driven compressor 101 which is given by the desired-speed calculating block 125. In addition, the temperature sensor 137 informs the limiting block 134 of the temperature of the drive portion of the inverter 121. The limiting block 134 limits the upper side of the desired rotational speed in response to the temperature of the drive portion of the inverter 121. Specifically, the limiting block 134 calculates an upper limit of the desired rotational speed of the motor of the electrically-driven compressor 101 from the temperature of the drive portion of the inverter 121. As shown in FIG. 21, the calculated upper limit is equal to a highest preset rotational speed UL21 when the temperature of the drive portion of the inverter 121 is equal to or lower than a first preset temperature point T31. The calculated upper limit falls from the highest preset rotational speed UL21 to a lowest preset rotational speed UL22 as the temperature of the drive portion of the inverter 121 rises from the first preset temperature point T31 to a second preset temperature point T32. The calculated upper limit is equal to the lowest preset rotational speed UL22 when the temperature of the drive portion of the inverter 121 is equal to or higher than the second preset temperature point T32. The second present temperature point T32 is equal to, for example, 120° C. The lowest preset rotational speed UL22 is equal to, for example, 50 Hz. When the desired rotational speed of the motor of the electrically-driven compressor 101 is equal to or lower than the upper limit, the limiting block 134 holds the desired rotational speed unchanged. In other words, the limiting block 134 does not change the desired rotational speed. On the other hand, when the desired rotational speed of the motor of the electrically-driven compressor 101 exceeds the upper limit, the limiting block 134 sets or reduces the desired rotational speed to the upper limit. In this way, the limiting block 134 limits the upper side of the desired rotational speed. A speed outputting block 126 is informed of the desired rotational speed of the motor of the electrically-driven compressor 101 which is given by the limiting block 134. The speed outputting block 126 outputs information of the desired rotational speed to the inverter 121. Accordingly, the inverter 121 is adjusted in response to the desired rotational speed so that the actual rotational speed of the motor of the electrically-driven compressor 101 will be substantially equal to the desired rotational speed thereof.

A description will now be given of the case where the air conditioning apparatus is operated in the cooling mode under the following conditions. The cooling load is relatively great. The position or the state of an intake air selector 127 corresponds to fresh air introduction. In this case, the pressure at the inlet of the electrically-driven compressor 101 tends to rise. Generally, the load applied to the inverter 121 by the electrically-driven compressor 101 increases in accordance with the rise in the pressure at the inlet of the electrically-driven compressor 101. A drive current fed to the electrically-driven compressor 101 from the inverter 121 increases as the load on the inverter 121 increases. Accordingly, the temperature of the drive portion of the inverter 121 increases in accordance with the rise in the pressure at the inlet of the electrically-driven compressor 101. As previously described, the controller 120E or the limiting block 134 in FIG. 20 limits the desired rotational speed of the motor of the electrically-driven compressor 101 to within the range equal to or smaller than the upper limit (for example, 50 Hz). Accordingly, the pressure at the outlet of the electrically-driven compressor 101 is prevented from excessively rising. In addition, the temperature of the drive portion of the inverter 121 is prevented from excessively increasing.

A description will now be given of the case where the air conditioning apparatus is operated in the heating mode under the following conditions. The heating load is relatively small. Air in a vehicle interior is sufficiently warm. The position or the state of the intake air selector 127 corresponds to air recirculation (indoor air introduction). In this case, the pressure at the inlet of the electrically-driven compressor 101 tends to rise. Generally, the load applied to the inverter 121 by the electrically-driven compressor 101 increases in accordance with the rise in the pressure at the inlet of the electrically-driven compressor 101. A drive current fed to the electrically-driven compressor 101 from the inverter 121 increases as the load on the inverter 121 increases. Accordingly, the temperature of the drive portion of the inverter 121 increases in accordance with the rise in the pressure at the inlet of the electrically-driven compressor 101. As previously described, the controller 120E or the limiting block 134 in FIG. 20 limits the desired rotational speed of the motor of the electrically-driven compressor 101 to within the range equal to or smaller than the upper limit (for example, 50 Hz). Accordingly, the pressure at the outlet of the electrically-driven compressor 101 is prevented from excessively rising. In addition, the temperature of the drive portion of the inverter 121 is prevented from excessively increasing.

Seventh Embodiment

Figure 22:
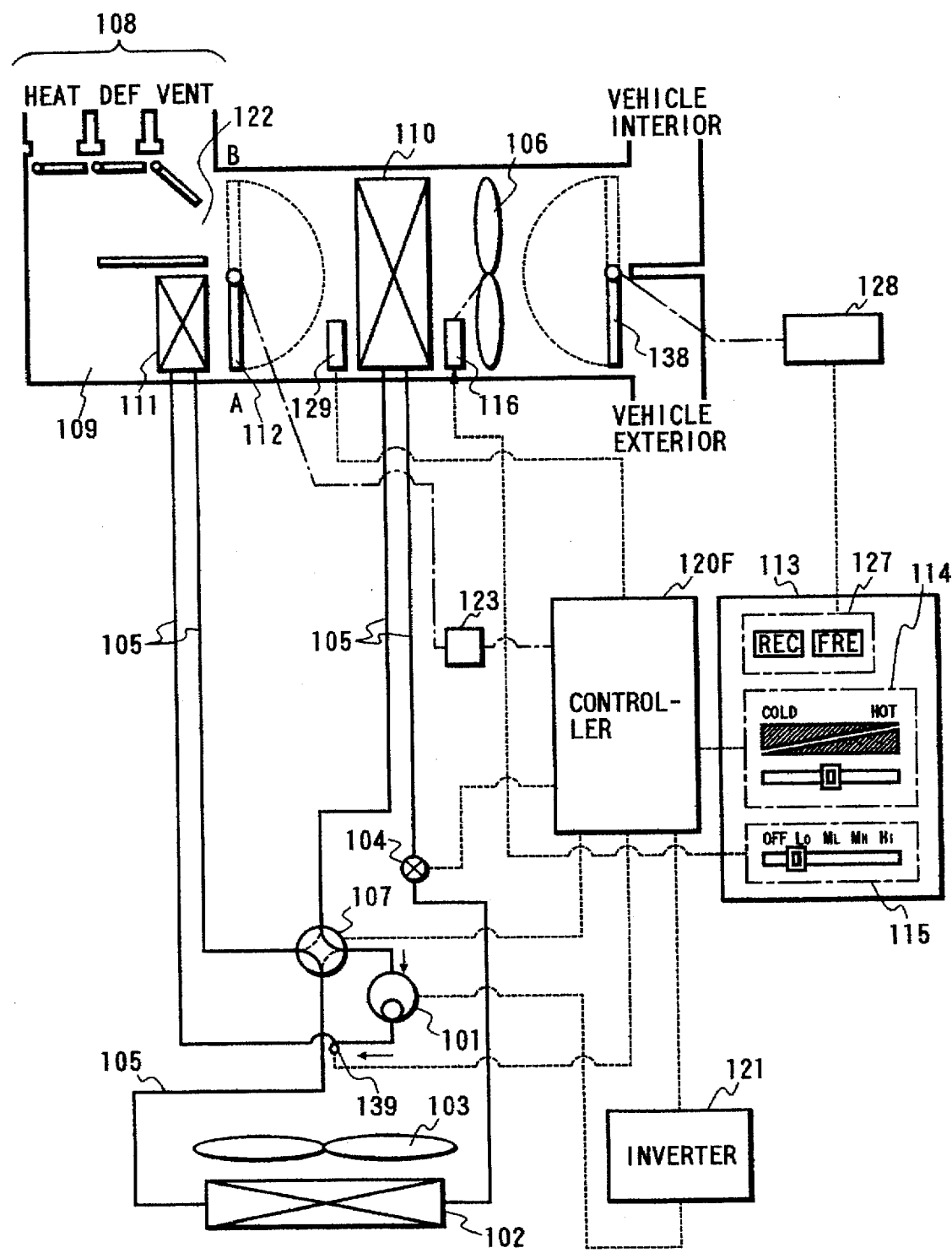
FIG. 22 is a diagram of an air conditioning apparatus for an electric vehicle according to a seventh embodiment of this invention.

FIG. 22 shows a seventh embodiment of this invention which is similar to the embodiment of FIGS. 3–8 except that a controller 120F replaces the controller 120 of FIG. 3, and that a pressure sensor 139 is additionally provided which detects the pressure at the outlet of an electrically-driven compressor 101.

The controller 120F includes a microcomputer or a similar device having a combination of a CPU, a ROM, a RAM, and an input/output port (an interface). The controller 120F is electrically connected to a refrigerant throttle valve 104, a four-way valve 107, a mix actuator 123, a temperature setting device 114, an inverter 121, a temperature sensor 129, and the pressure sensor 139. The controller 120F operates in accordance with a program stored in the internal ROM. According to the program, the controller 120F controls the refrigerant throttle valve 104, the four-way valve 107, the mix actuator 123, and the inverter 121 in response to a desired temperature (a setting temperature) set by the temperature setting device 114, a temperature detected by the temperature sensor 129, and the pressure detected by the pressure sensor 139.

Figure 24:
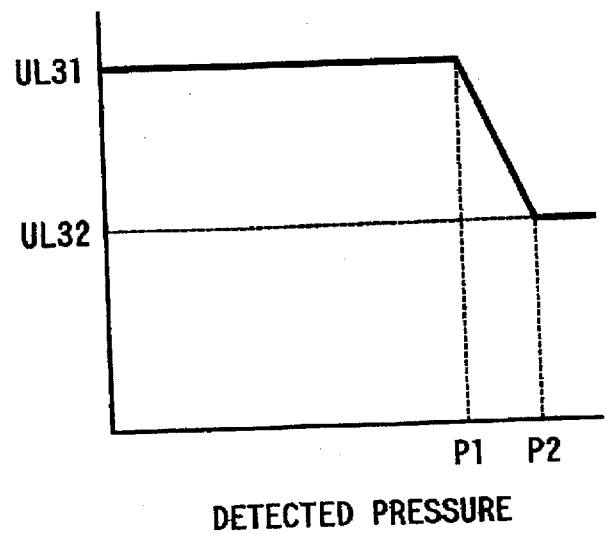
FIG. 24 is a diagram of a relation between an upper limit of the rotational speed of a motor of an electrically-driven compressor and a detected pressure at the outlet of the electrically-driven compressor in the apparatus of FIG. 22.
Figure 23:
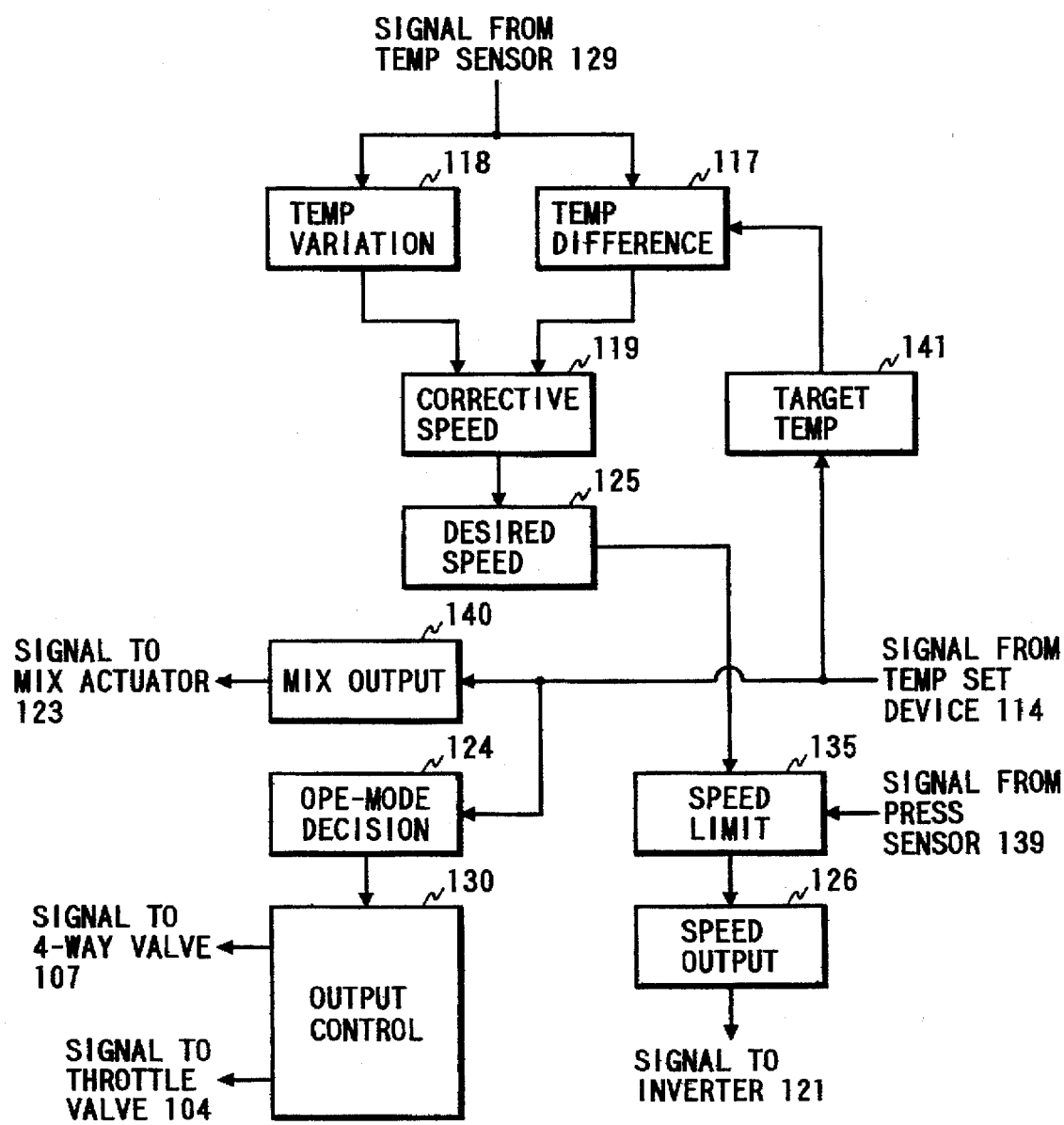
FIG. 23 is a flow diagram of operation of a controller in FIG. 22.

FIG. 23 is a flow diagram of operation of the controller 120F. With reference to FIG. 23, a desired-speed calculating block 125 is followed by a limiting block 135. The limiting block 135 is informed of the desired rotational speed of the motor of the electrically-driven compressor 101 which is given by the desired-speed calculating block 125. In addition, the pressure sensor 139 informs the limiting block 135 of the pressure at the outlet of the electrically-driven compressor 101. The limiting block 135 limits the upper side of the desired rotational speed in response to the pressure at the outlet of the electrically-driven compressor 101. Specifically, the limiting block 135 calculates an upper limit of the desired rotational speed of the motor of the electrically-driven compressor 101 from the pressure at the outlet of the electrically-driven compressor 101. As shown in FIG. 24, the calculated upper limit is equal to a highest preset rotational speed UL31 when the pressure at the outlet of the electrically-driven compressor 101 is equal to or lower than a first preset pressure point P1. The calculated upper limit falls from the highest preset rotational speed UL31 to a lowest preset rotational speed UL32 as the pressure at the outlet of the electrically-driven compressor 101 rises from the first preset pressure point P1 to a second preset pressure point P2. The calculated upper limit is equal to the lowest preset rotational speed UL32 when the pressure at the outlet of the electrically-driven compressor 101 is equal to or higher than the second preset pressure point P2. The second present pressure point P2 is equal to, for example, 20 kgf/cm$^2$. The lowest preset rotational speed UL32 is equal to, for example, 50 Hz. When the desired rotational speed of the motor of the electrically-driven compressor 101 is equal to or lower than the upper limit, the limiting block 135 holds the desired rotational speed unchanged. In other words, the limiting block 135 does not change the desired rotational speed. On the other hand, when the desired rotational speed of the motor of the electrically-driven compressor 101 exceeds the upper limit, the limiting block 135 sets or reduces the desired rotational speed to the upper limit. In this way, the limiting block 135 limits the upper side of the desired rotational speed. A speed outputting block 126 is informed of the desired rotational speed of the motor of the electrically-driven compressor 101 which is given by the limiting block 135. The speed outputting block 126 outputs information of the desired rotational speed to the inverter 121. Accordingly, the inverter 121 is adjusted in response to the desired rotational speed so that the actual rotational speed of the motor of the electrically-driven compressor 101 will be substantially equal to the desired rotational speed thereof.

A description will now be given of the case where the air conditioning apparatus is operated in the cooling mode under the following conditions. The cooling load is relatively great. The position or the state of an intake air selector 127 corresponds to fresh air introduction. In this case, the pressure at the inlet of the electrically-driven compressor 101 tends to rise. Generally, the pressure at the outlet of the electrically-driven compressor 101 increases in accordance with the rise in the pressure at the inlet thereof. As previously described, in response to the pressure at the outlet of the electrically-driven compressor 101, the controller 120F or the limiting block 135 in FIG. 23 limits the desired rotational speed of the motor of the electrically-driven compressor 101 to within the range equal to or smaller than the upper limit (for example, 50 Hz). Accordingly, the pressure at the outlet of the electrically-driven compressor 101 is prevented from excessively rising.

A description will now be given of the case where the air conditioning apparatus is operated in the heating mode under the following conditions. The heating load is relatively small. Air in a vehicle interior is sufficiently warm. The position or the state of the intake air selector 127 corresponds to air recirculation (indoor air introduction). In this case, the pressure at the inlet of the electrically-driven compressor 101 tends to rise. Generally, the pressure at the outlet of the electrically-driven compressor 101 increases in accordance with the rise in the pressure at the inlet thereof. As previously described, in response to the pressure at the outlet of the electrically-driven compressor 101, the controller 120F or the limiting block 135 in FIG. 23 limits the desired rotational speed of the motor of the electrically-driven compressor 101 to within the range equal to or smaller than the upper limit (for example, 50 Hz). Accordingly, the pressure at the outlet of the electrically-driven compressor 101 is prevented from excessively rising.

Other Embodiments

An eighth embodiment of this invention corresponds to a combination of the first embodiment and the third embodiment thereof. A ninth embodiment of this invention corresponds to a combination of the second embodiment and the third embodiment thereof. A tenth embodiment of this invention corresponds to a combination of the second embodiment, the third embodiment, the fourth embodiment, the fifth embodiment, the sixth embodiment, and the seventh embodiment thereof. An eleventh embodiment of this invention corresponds to a combination of at least two of the first embodiment, the second embodiment, the third embodiment, the fourth embodiment, the fifth embodiment, the sixth embodiment, and the seventh embodiment thereof.

In each of the first embodiment, the second embodiment, the third embodiment, the fourth embodiment, the fifth embodiment, the sixth embodiment, and the seventh embodiment of this invention, the setting temperature given by the temperature setting device 114 may be replaced by another parameter such as a desired temperature of air discharged into the vehicle interior or a desired thermal load.

What is claimed is:

1. An air conditioning apparatus for an electric vehicle, comprising:

an electrically-driven compressor;

first means for setting a desired temperature related to one of a temperature of air discharged into a vehicle interior and a temperature within the vehicle interior;

a heat exchanger;

second means for detecting a temperature related to the heat exchanger;

an inverter connected to the compressor for driving the compressor at a variable speed corresponding to a desired rotational speed;

third means for calculating a target temperature related to the heat exchanger in response to the desired temperature set by the first means;

fourth means for calculating a difference between the temperature detected by the second means and the target temperature calculated by the third means;

fifth means for calculating a variation in the temperature detected by the second means for every given period;

sixth means for calculating a corrective rotational speed from the temperature difference calculated by the fourth means and the temperature variation calculated by the fifth means for every given period;

seventh means for calculating a sum of a current desired rotational speed of the compressor and the corrective rotational speed calculated by the sixth means for every given period, and for setting the calculated sum as a new desired rotational speed of the compressor for every given period; and eighth means for informing the inverter of the new desired rotational speed of the compressor which is set by the seventh means.

2. An air conditioning apparatus as recited in claim 1, further comprising ninth means for setting a desired flow rate of air discharged into the vehicle interior, and tenth means for limiting an upper side of the new desired rotational speed of the compressor which is set by the seventh means in response to the desired flow rate set by the ninth means or in response to an actual flow rate.

3. An air conditioning apparatus as recited in claim 1, further comprising ninth means for selectively introducing air from the vehicle interior or air from a vehicle exterior, and tenth means for limiting an upper side of the new desired rotational speed of the compressor which is set by the seventh means in response to whether the ninth means introduces air from the vehicle interior or air from the vehicle exterior.

4. An air conditioning apparatus as recited in claim 3, further comprising eleventh means for deciding whether cooling operation or heating operation is currently executed, and twelfth means responsive to a result of said deciding by the eleventh means for limiting the upper side of the new desired rotational speed of the compressor which is set by the seventh means in response to whether the cooling operation or the heating operation is currently executed.

5. An air conditioning apparatus as recited in claim 1, further comprising ninth means for detecting a temperature of a motor winding of the compressor, and tenth means for limiting an upper side of the new desired rotational speed of the compressor which is set by the seventh means in response to the temperature detected by the ninth means.

6. An air conditioning apparatus as recited in claim 1, further comprising ninth means for detecting a temperature of a drive portion of the inverter, and tenth means for limiting an upper side of the new desired rotational speed of the compressor which is set by the seventh means in response to the temperature detected by the ninth means.

7. An air conditioning apparatus as recited in claim 1, further comprising ninth means for detecting a pressure at an outlet of the compressor, and tenth means for limiting an upper side of the new desired rotational speed of the compressor which is set by the seventh means in response to the pressure detected by the ninth means.

8. An air conditioning apparatus comprising: a compressor;

a heat exchanger;

first means including refrigerant for connecting the compressor and the heat exchanger to allow the refrigerant to flow through the compressor and the heat exchanger;

second means for providing a target temperature of air downstream of the heat exchanger;

third means for detecting an actual temperature of air downstream of the heat exchanger;

fourth means for calculating a difference between the target temperature provided by the second means and the actual temperature detected by the third means;

fifth means for detecting a variation in the actual temperature detected by the third means; and sixth means for controlling a rotational speed of the compressor in response to the temperature difference calculated by the fourth means and the temperature variation detected by the fifth means.

9. An air conditioning apparatus as recited in claim 8, wherein the sixth means comprises seventh means for calculating a desired rotational speed of the compressor from the temperature difference calculated by the fourth means and the temperature variation detected by the fifth means, and eighth means for controlling an actual rotational speed of the compressor in accordance with the desired rotational speed calculated by the seventh means.

10. An air conditioning apparatus as recited in claim 9, further comprising ninth means for setting a desired flow rate of discharged air, and tenth means for limiting an upper side of the desired rotational speed calculated by the seventh means in response to the desired flow rate set by the ninth means or in response to an actual flow rate.

11. An air conditioning apparatus as recited in claim 9, further comprising ninth means for selectively introducing air from an air-conditioned space or air from an exterior of the air-conditioned space, and tenth means for limiting an upper side of the desired rotational speed calculated by the seventh means in response to whether the ninth means introduces air from the air-conditioned space or air from the exterior of the air-conditioned space.

12. An air conditioning apparatus as recited in claim 11, further comprising eleventh means for deciding whether cooling operation or heating operation is currently executed, and twelfth means responsive to a result of said deciding by the eleventh means for limiting the upper side of the desired rotational speed calculated by the seventh means in response to whether the cooling operation or the heating operation is currently executed.

13. An air conditioning apparatus as recited in claim 9, further comprising ninth means for detecting a temperature of a motor winding of the compressor, and tenth means for limiting an upper side of the desired rotational speed calculated by the seventh means in response to the temperature detected by the ninth means.

14. An air conditioning apparatus as recited in claim 9, further comprising an inverter provided in the eighth means for driving the compressor at a rotational speed corresponding to the desired rotational speed thereof, ninth means for detecting a temperature of a drive portion of the inverter, and tenth means for limiting an upper side of the desired rotational speed in response to the temperature detected by the ninth means.

15. An air conditioning apparatus as recited in claim 9, further comprising ninth means for detecting a pressure at an outlet of the compressor, and tenth means for limiting an upper side of the desired rotational speed calculated by the seventh means in response to the pressure detected by the ninth means.

* * * * *